United States Patent
Simonaru et al.

(10) Patent No.: US 6,613,128 B1
(45) Date of Patent: *Sep. 2, 2003

(54) TWIN SCREW EXTRUDER, METHOD OF MAKING AROMATIC POLYCARBONATE USING A TWIN SCREW EXTRUDER, AND METHOD OF REMOVING VOLATILES FROM AN AROMATIC POLYCARBONATE MELT

(75) Inventors: Masasi Simonaru, Iwakuni (JP); Toru Sawaki, Iwakuni (JP); Katsushi Sasaki, Iwakuni (JP); Kazuki Hatono, Iwakuni (JP); Eiji Ito, Iwakuni (JP)

(73) Assignee: Teijin Limited, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/509,946
(22) PCT Filed: Aug. 3, 1999
(86) PCT No.: PCT/JP99/04191
§ 371 (c)(1), (2), (4) Date: Apr. 4, 2000
(87) PCT Pub. No.: WO00/07799
PCT Pub. Date: Feb. 17, 2000

(30) Foreign Application Priority Data

Aug. 4, 1998 (JP) ............................................ 10-220392

(51) Int. Cl.[7] .......................... B01D 19/00; B29C 47/76; C08G 64/40
(52) U.S. Cl. ............................ 95/260; 95/248; 95/261; 95/262; 96/217; 425/74; 425/209; 425/381.2; 425/382.3; 425/382.4; 425/DIG. 243; 425/203; 264/102; 264/176.1; 264/211.21; 366/79; 366/81; 366/82

(58) Field of Search .......................... 95/149, 151, 195, 95/196, 197, 205, 228, 230, 237, 239, 189, 248, 260, 261, 262; 425/73, 74, 200, 203, 204, 209, 210, 381.2, 382.3, 382.4, DIG. 243; 96/217; 264/101–102, 176.1, 211.21, 211.23, 211.24, 349; 366/75, 79, 81–85

(56) References Cited

U.S. PATENT DOCUMENTS 2,615,199 A * 10/1952 Fuller .......................... 425/204
2,753,595 A * 7/1956 Dulmage ..................... 96/217

(List continued on next page.)

FOREIGN PATENT DOCUMENTS

DE 34 28 817 A 2/1985
EP 0 267 531 A 5/1988

(List continued on next page.)

OTHER PUBLICATIONS

Database WPI, Week 9849, Derwent Publications Ltd., (List continued on next page.)

*Primary Examiner*—Duane Smith
*Assistant Examiner*—Jason M. Greene
(74) *Attorney, Agent, or Firm*—Sughrue Mion, PLLC

(57) ABSTRACT

An aromatic polycarbonate extruder which is a twin screw extruder for kneading components into a molten aromatic polycarbonate, the extruder having at least one module consisting of a kneading unit, a material seal unit, a back kneading unit and full-flight unit which are arranged from an upstream side to a downstream side and a method of kneading components into an aromatic polycarbonate by using the above extruder. The present invention also provides a kneading apparatus and method for producing an aromatic polycarbonate which has an extremely small content of foreign matter and is free from residence deterioration such as coloration, crosslinking or gelation when the aromatic polycarbonate is to be kneaded with various components.

19 Claims, 7 Drawing Sheets

U.S. PATENT DOCUMENTS

| | | | | |
|---|---|---|---|---|
| 4,330,511 A | * | 5/1982 | Nelson et al. | 95/195 |
| 4,663,103 A | | 5/1987 | McCullough et al. | |
| 4,837,112 A | * | 6/1989 | Calandro et al. | 426/450 |
| 4,943,402 A | * | 7/1990 | Kafka et al. | 425/204 |
| 5,125,824 A | * | 6/1992 | Schaarschmidt | 425/203 |
| 5,266,256 A | * | 11/1993 | Jerman et al. | 425/204 |
| 5,297,864 A | * | 3/1994 | Knoll et al. | 174/261 |
| 5,306,452 A | * | 4/1994 | Todd | 425/203 |
| 5,354,804 A | * | 10/1994 | Inada et al. | 524/502 |
| 5,486,366 A | * | 1/1996 | Song et al. | 425/204 |
| 5,539,004 A | * | 7/1996 | Ikeda et al. | 521/45 |
| 5,681,908 A | * | 10/1997 | Mehra et al. | 95/237 |
| 5,717,055 A | | 2/1998 | Hosomi et al. | |

FOREIGN PATENT DOCUMENTS

| | | |
|---|---|---|
| EP | 0 364 634 A | 4/1990 |
| EP | 0 423 759 A | 4/1991 |
| EP | 0 650 813 A | 5/1995 |
| EP | 0 738 579 A | 10/1996 |
| EP | 0 764 673 A | 3/1997 |
| EP | 0 768 157 A | 4/1997 |
| EP | 0 769 361 A | 4/1997 |
| JP | 63 023926 A | 2/1988 |
| JP | 07268091 | 10/1995 |
| JP | 08059975 | 5/1996 |
| WO | 94 11175 A | 5/1994 |

OTHER PUBLICATIONS

London, GB; AN 1998–583614, XP00212640 & WO 98 47938 A (Teijin Ltd), Oct. 29, 1998, abstract (Copy submitted to USPTO by WIPO).

Manfred H. Pahl: "Mischen beim Herstellen und Verarbeiten von Kunststoffen" 1986, VDI–Verlag GMBH, Düsseldorf XP002121639, p. 208, line /—p. 209 (Copy submitted to USPTO by WIPO).

International Search Report.

* cited by examiner

Forward kneading unit

Neutral kneading unit

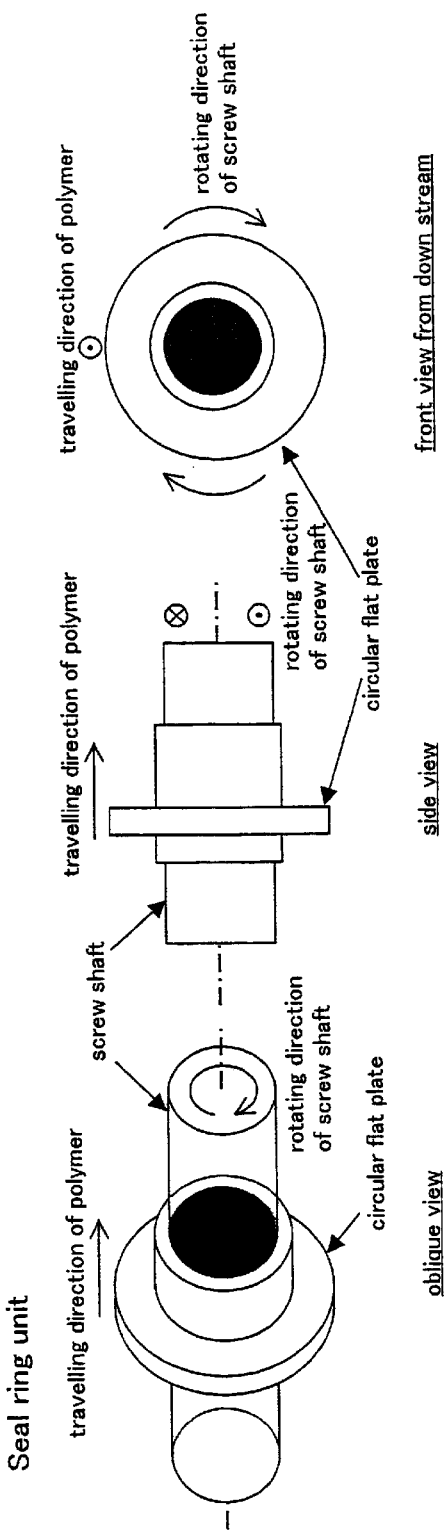
FIG. 1 (e) Seal ring unit
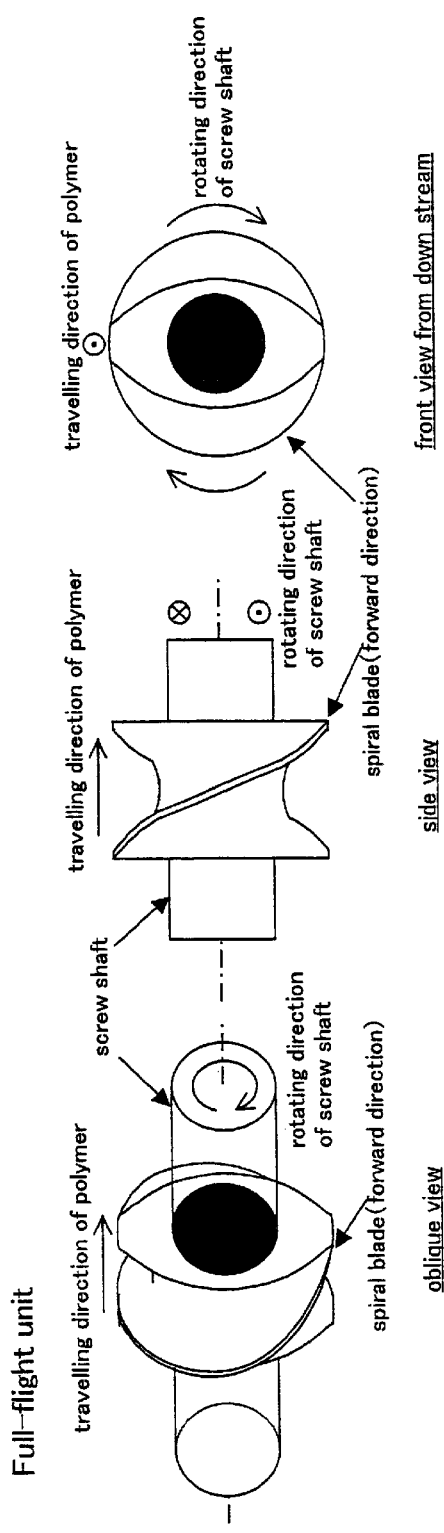
FIG. 1 (f) Full-flight unit

TWIN SCREW EXTRUDER, METHOD OF MAKING AROMATIC POLYCARBONATE USING A TWIN SCREW EXTRUDER, AND METHOD OF REMOVING VOLATILES FROM AN AROMATIC POLYCARBONATE MELT

BACKGROUND OF THE INVENTION

1. Field of the Invention

The present invention relates to an apparatus and a method for kneading components into an aromatic polycarbonate. More specifically, it relates to a kneading apparatus and method which have an excellent kneading effect, suppress coloration, crosslinking and gelation due to the residence of a resin and can obtain a product having a small content of foreign matter when components to be kneaded, such as a terminal OH group capping agent, catalyst deactivator, devolatilizing agent and resin additives are added to and kneaded into an aromatic polycarbonate. Particularly, it relates to a twin screw extruder for adding and kneading the above components into an aromatic polycarbonate and the improvement of the extruder.

2. Prior Art

Aromatic polycarbonates are widely used for various purposes due to their excellent mechanical properties such as impact resistance and transparency. Known methods for producing such aromatic polycarbonates include an interfacial polymerization method in which a dihydroxy compound and phosgene are directly reacted with each other, a melt polymerization method in which an ester exchange reaction between a dihydroxy compound and a carbonic acid diester is carried out under heating and reduced pressure, and the like.

An aromatic polycarbonate obtained by polymerization is generally kneaded with various components using an intermeshing twin screw extruder. In this kneading step, the coloration, crosslinking and gelation of the aromatic polycarbonate occur, and the content of foreign matter contained in the aromatic polycarbonate increases, thereby exerting a great influence upon the quality of a final product.

These problems are serious for an aromatic polycarbonate which has recently been used in optical recording media that is required high recording density and high accuracy, such as a DVD, MO and CDR because such problems as coloration and gelation have a direct influence upon the optical properties such as a block error rate and mechanical properties such as tensile strength, flexural strength and toughness of a final product.

It is an object of the present invention to provide a kneading apparatus and method for producing an aromatic polycarbonate which has an extremely small content of foreign matter and is free from residence deterioration such as coloration, crosslinking or gelation when the aromatic polycarbonate is to be kneaded with various components.

BRIEF DESCRIPTION OF THE ACCOMPANYING DRAWINGS

FIGS. 1(a) to (g) are oblique, side and front views showing the configurations of various segments fitted onto the each screw shaft of a twin screw extruder (in the present invention, at least one 'segment' is used to construct an 'unit' constituting a 'module');

Figure 3:
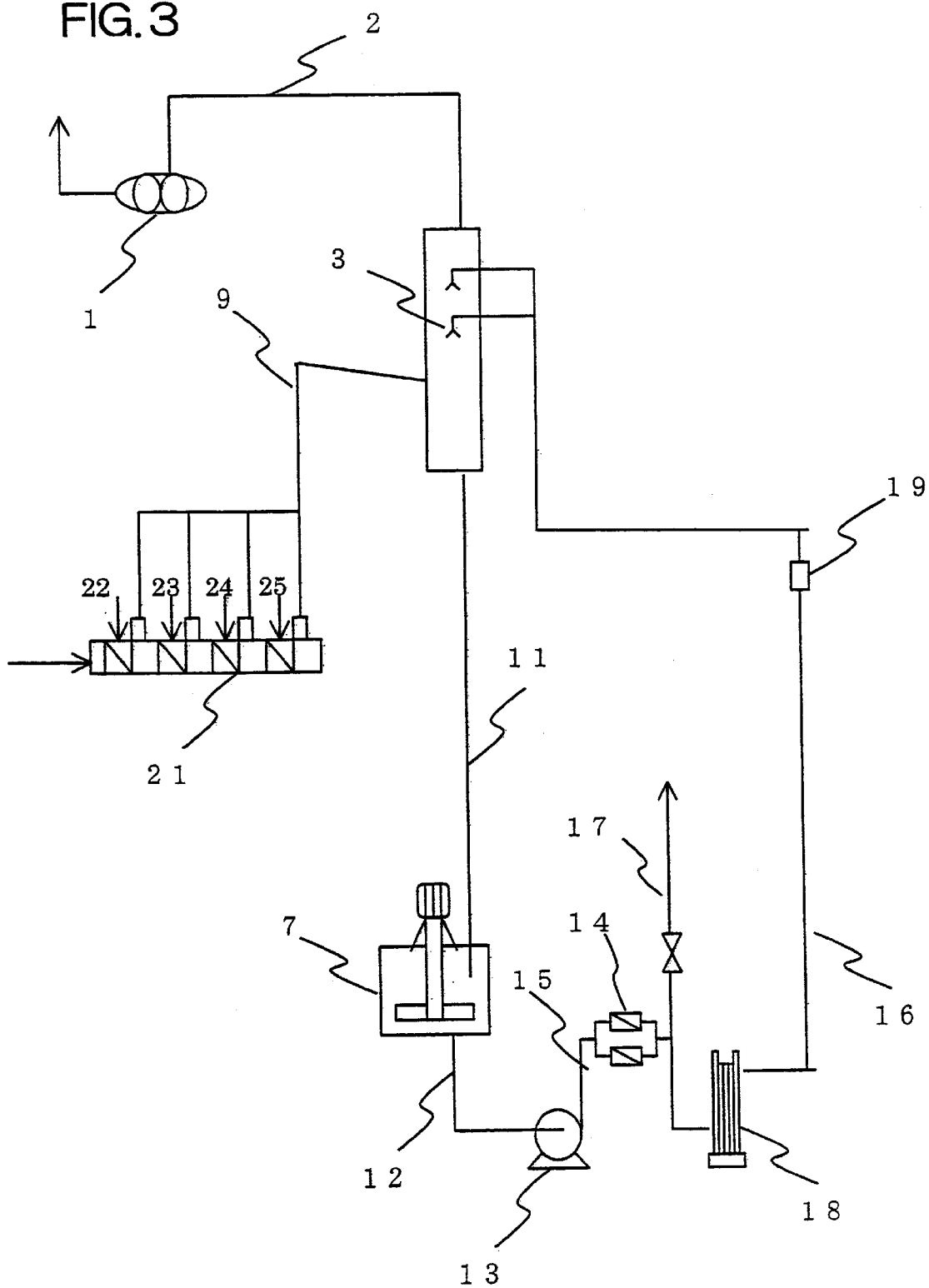
FIG. 3 is a schematic diagram of a system for collecting volatile components accompanyed with water vapor discharged from the twin screw extruder.
Figure 4:
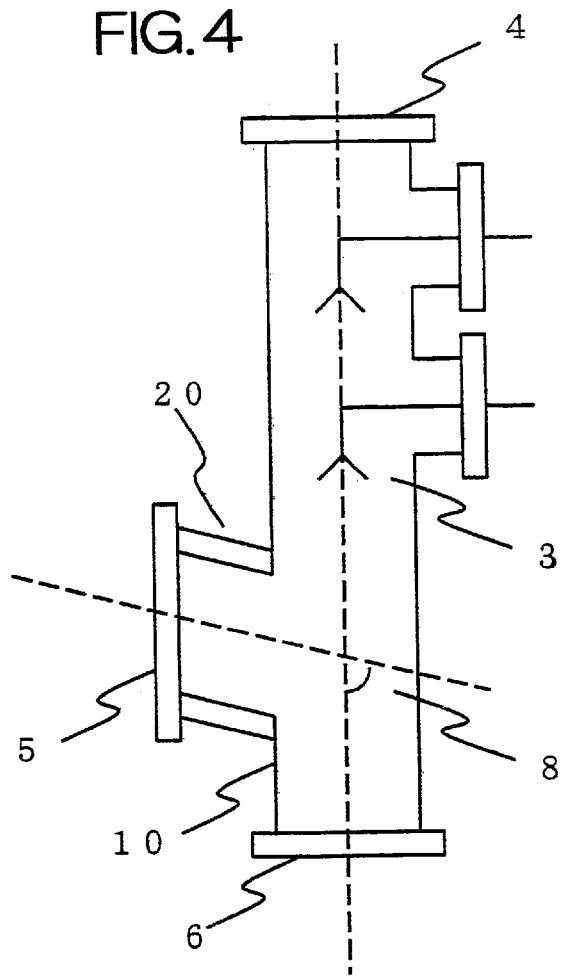
FIG. 4 is a diagram of a scrubber body and spraies in the collection system.
Figure 5:
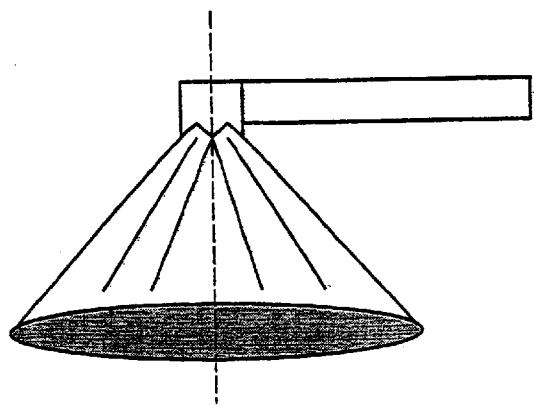
FIG. 5 is a diagram showing the form of conical spray containing liquid drops inside a spray cone (solid conical spray)

Reference numerals in FIGS. 3 to 5 denote the following elements.

1 vacuum generator (vacuum pump)
2 vacuum-line
3 spray nozzle
4 outlet for the vacuum line
5 inlet for the vapor line
6 outlet for the scrubbing solution line
7 scrubbing solution storage tank
8 installation angle between scrubber and vapor inlet line
9 vapor line
10 scrubber
11 scrubbing solution line
12 scrubbing solution line
13 scrubbing solution pump
14 separator (filter)
15 scrubbing solution line
16 scrubbing solution line
17 scrubbing solution discharging line
18 cooler
19 flow meter
20 steam jacket
21 twin screw extruder
22 liquid injection nozzle
23 to 25 liquid injection nozzle Terms for the units of an extruder and related to these in this specification mean as follows. FIGS. 1(a) to 1(g) are used when needed for explanation.

A figure on the left side of FIG. 1(a) is a perspective view of a spindle-shaped flat plate fitted onto the single screw shaft of an extruder, a figure in the middle is a side view of the spindle-shaped flat plate fitted onto the screw shaft of the extruder when seen from a direction perpendicular to the center of the screw shaft of the extruder and a figure on the right side is a front view of the spindle-shaped flat plate fitted onto the screw shaft of the extruder when seen from the direction of the center of the screw shaft of the extruder (on a downstream side).

FIG. 1(b) is a combination of oblique, side and front views of a back kneading segment.

FIG. 1(c) is a combination of oblique, side and front views of a forward kneading segment.

FIG. 1(d) is a combination of oblique, side and front views of a neutral kneading segment.

FIG. 1(e) is a combination of oblique, side and front views of a seal ring segment.

FIG. 1(f) is a combination of oblique, side and front views of a full-flight segment.

FIG. 1(g) is a combination of oblique, side and front views of a back flight segment.

A resin moves from left to right in the oblique views of FIGS. 1(a) to 1(g). In this specification, the long axis and short axis of the flat plate mean lengths indicated by numerals 1 and 2 in the front view of FIG. 1(a).

The term "agitation element" means a screw segment having a specific shape for the purpose of stirring, kneading and transferring a resin according to the function and purpose of the segment of a twin screw extruder, such as a back kneading segment, forward kneading segment or neutral kneading segment which will be described hereinafter.

The expression "on a downstream side" means a downstream side of a flow of a resin to be kneaded.

Back Kneading Unit;

As shown in FIG. 1(b), the "back kneading segment" means an agitation element constructed by combining together a plurality of (generally 5 to 13) flat plates having basically a spindle shape when seen from a transverse direction of the twin screw extruder. The spindle-shaped flat plates are combined together in a direction opposite to the traveling direction of the resin in such a manner that they are shifted from one another at a phase angle larger than 0° and smaller than 90° in a negative direction when the rotating direction of the screw shaft of the extruder is positive, and the center of the screw shaft passes through an intersection point between the long axis and the short axis of each of the spindle-shaped flat plates in a direction perpendicular to the spindle-shaped flat plate. In the twin screw extruder, the agitation units are set such that they engage with one another. In the present invention, a group consisting of at least one back kneading segment is called "back kneading unit".

Forward Kneading Unit;

As shown in FIG. 1(c), the "forward kneading segment" means an agitation element constructed by combining together a plurality of (generally 5 to 13) flat plates having basically a spindle shape when seen from a transverse direction of the twin screw extruder. The spindle-shaped flat plates are combined together in a direction opposite to the traveling direction of the resin to be kneaded in such a manner that they are shifted from one another at a phase angle larger than 0° and smaller than 90° in a positive direction when the rotating direction of the screw shaft of the extruder is positive and, and the center of the screw shaft passes in through an intersection point between the long axis and the short axis of each of the spindle-shaped flat plates in a direction perpendicular to the spindle-shaped flat plate. In the twin screw extruder, the agitation units are set such that they engage with one another. In the present invention, a group consisting of at least one forward kneading segment is called "forward kneading unit".

Neutral Kneading Unit;

As shown in FIG. 1(d), the "neutral kneading segment" means an agitation element constructed by combining together a plurality of (generally 5 to 13) flat plates having basically a spindle shape when seen from a transverse direction to the thickness of the twin screw extruder. The spindle-shaped flat plates are combined together in such a manner that they are substantially shifted from one another at a phase angle of 90° in the rotating direction of the screw shaft of the extruder, and the center of the screw shaft passes through an intersection point between the long axis and the short axis of each of the spindle-shaped flat plates in a direction perpendicular to the spindle-shaped flat plate. In the twin screw extruder, the agitation units are set such that they engage with one another. In the present invention, a group consisting of at least one neutral kneading segment is called "neutral kneading unit".

Full-flight Unit;

As shown in FIG. 1(f), the "full-flight segment" means an agitation element figured a spiral rotary blade portion of the extruder, which is formed spirally around the screw shaft of the extruder without a break and whose spiral direction is set to move the resin in the traveling direction of the resin by the rotation of the screw shaft of the extruder. A pair of such segments locate on each screw shaft of the twine screw extruder so as to mesh with each other (segment). In the present invention, a group consisting of at least one full-flight segment is called "full-flight unit".

Back Flight Unit;

As shown in FIG. 1(g), the "back flight segment" means an agitation element figured a spiral rotary blade portion of the extruder, which is formed spirally around the screw shaft of the extruder without a break and whose spiral direction is set to move the resin in a backward direction of the resin by the rotation of the screw shaft of the extruder. A pair of such segments locate on each screw shaft of the twin screw extruder so as to mesh with each other (segment). In the present invention, a group consisting of at least one back flight segment is called "back flight unit".

Kneading Unit;

The "kneading unit" means an agitation element of a twin screw extruder, which is installed to knead the components of the present invention and is constructed by installing the back kneading unit, the forward kneading unit and the neutral kneading unit in a desired order repeatedly as required.

Seal Ring Unit;

As shown in FIG. 1(e), the "seal ring unit" means an agitation unit composed of at least one flat plate having a circular shape in a transverse direction. The center of the screw shaft of the extruder passes through the center of the disk in a direction perpendicular to the disk. The seal ring unit prevents the traveling of the resin and has such a structure that the resin passes through a clearance between a cylinder body and the seal ring unit.

Material Seal Unit;

The "material seal unit" means an agitation element of a twin screw extruder, which is installed to enable an upstream portion and a downstream portion thereof to take different operation pressures. It means an agitation element including a portion whose space is substantially completely filled with the resin to be kneaded when the section of the extruder is seen, and the sealing ring unit or the back flight unit can be the material seal unit.

The expression "intermeshing twin screw extruder" as used herein means an extruder having excellent transfer, reaction, kneading and devolatilizing functions, whose right and left shafts are meshed with each other to obtain a self-cleaning effect and remove a residence portion of the resin.

The expression "resin filling rate" means the ratio of the volume of a molten resin to the volume of a space in the twin screw extruder.

Means for Solving the Problem

Studies conducted by the inventors of the present invention have revealed that the above object of the present invention is attained by using a module constructed by selecting specific units from various units described above to be fitted onto the screw shaft of an extruder and combining these when various additive components are to be kneaded into an aromatic polycarbonate using a twin screw extruder.

Therefore, according to the present invention, there is provided an aromatic polycarbonate extruder which is a twin screw extruder for kneading components into a molten aromatic polycarbonate, the extruder comprising at least one module (to be referred to as "module A" hereinafter) consisting of a kneading unit, a material seal unit, a back kneading unit and a full-flight unit which are arranged from an upstream side to a downstream side.

According to the present invention, there is further provided an aromatic polycarbonate extruder which is a twin screw extruder for kneading components into a molten aromatic polycarbonate, the extruder comprising at least one module (to be referred to as "module B" hereinafter) consisting of a neutral kneading unit or forward kneading unit, a back kneading unit and a full-flight unit which are arranged from a downstream side to an upstream side.

According to the present invention, there is further provided a method of kneading components into an aromatic polycarbonate using a twin screw extruder comprising at least one of the module A and the module B, the method comprising supplying the components to a specific area of the module and discharging volatile components from a specific area of the module as required.

The aromatic polycarbonate kneading apparatus and method of the present invention will be described in detail hereinunder.

A description is first given of the aromatic polycarbonate in the present invention.

In the present invention, residence deterioration such as the coloration, crosslinking or gelation of a resin is suppressed by using the above twin screw extruder when the components are kneaded into the resin and a resin having an extremely small content of foreign matter can be produced. As the aromatic polycarbonate resin to be supplied to an intermeshing twin screw extruder, aromatic polycarbonate resins obtained by various known methods per se may be used. They include, for example, what are produced by a reaction between a divalent phenol and a carbonate precursor such as phosgene in a solvent such as methylene chloride in the presence of a known acid receptor and a molecular weight control agent (interfacial polymerization) and what are produced by melt polycondensing an aromatic diol compound and a carbonic acid diester in the presence of an ester exchange catalyst or the like (melt polymerization). Particularly when polymerization is carried out continuously in accordance with the latter method, if the twin screw extruder must be stopped to remove foreign matter generated in the twin screw extruder, the polycondensation step must be stopped immediately because the polycondensation step and the kneading step using the twin screw extruder are directly connected to each other. Therefore, a great effect can be obtained by eliminating the need to stop the operation of the twin screw extruder which is realized by suppressing the generation of foreign matter in the twin screw extruder. Consequently, the present invention is advantageously applied to an aromatic polycarbonate which is produced by the melt polymerization method.

Illustrative examples of the aromatic diol compound used in the melt polycondensation include bis(4-hydroxyphenyl) methane, 2,2-bis(4-hydroxyphenyl)propane, 2,2-bis(4-hydroxy-3-methylphenyl)propane, 4,4-bis(4-hydroxyphenyl)heptane, 2,2-bis(4-hydroxy-3,5-dichlorophenyl)propane, 2,2-bis(4-hydroxy-3,5-dibromophenyl)propane, bis(4-hydroxyphenyl)oxide, bis(3,5-dichloro-4-hydroxyphenyl)oxide, p,p'-dihydroxydiphenyl, 3,3'-dichloro-4,4'-dihydroxydiphenyl, bis(hydroxyphenyl)sulfone, resorcinol, hydroquinone, 1,4-dihydroxy-2,5-dichlorobenzene, 1,4-dihydroxy-3-methylbenzene, bis(4-hydroxyphenyl)sulfide and bis(4-hydroxyphenyl)sulfoxide. Out of these, 2,2-bis(4-hydroxyphenyl)propane is particularly preferred.

Illustrative examples of the carbonic acid diester include diphenyl carbonate, ditolyl carbonate, bis(chlorophenyl) carbonate, m-cresyl carbonate, dinaphthyl carbonate, bis (diphenyl)carbonate, dimethyl carbonate, diethyl carbonate, dibutyl carbonate and dicyclohexyl carbonate. Out of these, diphenyl carbonate is particularly preferred.

The aromatic polycarbonate of the present invention may contain an aliphatic diol such as ethylene glycol, 1,4-butanediol, 1,4-cyclohexanedimethanol or 1,10-decanediol, dicarboxylic acid such as succinic acid, isophthalic acid, 2,6-naphthalenedicarboxylic acid, adipic acid, cyclohexanecarboxylic acid or terephthalic acid, oxyacid such as lactic acid, p-hydroxybenzoic acid, 6-hydroxy-2-naphthoic acid, or the like as required while it is produced. The aromatic polycarbonate of the present invention may be a copolymer of these.

An ester exchange catalyst is used for the production of an aromatic polycarbonate by a melt polymerization method as described above. The ester exchange catalyst is generally an alkali metal compound, alkali earth metal compound or nitrogen-containing basic compound.

The alkali metal compound used as a catalyst is, for example, a hydroxide, bicarbonate, carbonate, acetate, nitrate, nitrite, sulfite, cyanate, thiocyanate, stearate, borohydride, benzoate, hydrogenphosphate, bisphenol salt, phenol salt or the like of an alkali metal.

Illustrative examples of the alkali metal compound include sodium hydroxide, potassium hydroxide, lithium hydroxide, sodium bicarbonate, potassium bicarbonate, lithium bicarbonate, sodium carbonate, potassium carbonate, lithium carbonate, sodium acetate, potassium acetate, lithium acetate, sodium nitrate, potassium nitrate, lithium nitrate, sodium nitrite, potassium nitrite, lithium nitrite, sodium sulfite, potassium sulfite, lithium sulfite, sodium cyanate, potassium cyanate, lithium cyanate, sodium thiocyanate, potassium thiocyanate, lithium thiocyanate, sodium stearate, potassium stearate, lithium stearate, sodium borohydride, potassium borohydride, lithium borohydride, sodium phenylborate, sodium benzoate, potassium benzoate, lithium benzoate, disodium hydrogenphosphate, dipotassium hydrogenphosphate, dilithium hydrogenphosphate, disodium, dipotassium and dilithium salts of bisphenol A, and sodium, potassium and lithium salts of phenol.

The alkali earth metal compound used as a catalyst is an hydroxide, bicarbonate, carbonate, acetate, nitrate, nitrite, sulfite, cyanate, thiocyanate, stearate, borohydride, benzoate, bisphenol salt, phenol salt or the like of an alkali earth metal.

Illustrative examples of the alkali earth metal compound include calcium hydroxide, barium hydroxide, strontium hydroxide, calcium bicarbonate, barium bicarbonate, strontium bicarbonate, calcium carbonate, barium carbonate, strontium carbonate, calcium acetate, barium acetate, strontium acetate, calcium nitrate, barium nitrate, strontium nitrate, calcium nitrite, barium nitrite, strontium nitrite, calcium sulfite, barium sulfite, strontium sulfite, calcium cyanate, barium cyanate, strontium cyanate, calcium thiocyanate, barium thiocyanate, strontium thiocyanate, calcium stearate, barium stearate, strontium stearate, calcium borohydride, barium borohydride, strontium borohydride, calcium benzoate, barium benzoate, strontium benzoate, calcium salts, barium salts and strontium salts of bisphenol A, and calcium salts, barium salts and strontium salts of phenol.

The alkali metal compound or alkali earth metal compound is preferably used in an amount of $1 \times 10^{-8}$ to $5 \times 10^{-5}$ equivalent in terms of elemental alkali metal or elemental alkali earth metal contained in the catalyst based on 1 mol of the aromatic diol compound. The amount is more preferably $5 \times 10^{-7}$ to $1 \times 10^{-5}$ equivalent based on the same standard.

Illustrative examples of the nitrogen-containing basic compound as a-catalyst include ammonium hydroxides having an alkyl, aryl or alkylaryl group such as tetramethyl ammonium hydroxide ($Me_4NOH$, tetraethyl ammonium hydroxide ($Et_4NOH$), tetrabutyl ammonium hydroxide ($Bu_4NOH$), benzyltrimethyl ammonium hydroxide ($\phi$—$CH_2(Me)_3NOH$) and hexadecyltrimethyl ammonium hydroxide; tertiary amines such as triethylamine, tributylamine, dimethylbenzylamine and hexadecyldimethylamine; and basic salts such as tetramethyl ammonium borohydride ($Me_4NBH_4$), tetrabutyl ammonium borohydride ($Bu_4NBH_4$), tetrabutyl ammonium tetraphenyl borate ($Me_4NBPh_4$) and tetrabutyl ammonium tetraphenyl borate ($Bu_4NBPh_4$).

The above nitrogen-containing basic compound is preferably used in an amount of $1\times10^{-5}$ to $5\times10^{-3}$ equivalent in terms of ammonium nitrogen atoms contained in the nitrogen-containing basic compound based on 1 mol of the aromatic diol compound. The amount is more preferably $2\times10^{-5}$ to $5\times10^{-4}$ equivalent, particularly preferably $5\times10^{-5}$ to $5\times10^{-4}$ equivalent based on the same standard.

In the production of the aromatic polycarbonate, an alkali metal salt of silicon, germanium or tin oxoacid may be optionally used as a co-catalyst. Illustrative examples of the alkali metal salt as a co-catalyst are enumerated in JP-A 7-268091 (the term "JP-A" as used herein means an "unexamined published Japanese patent application"). An undesirable side reaction such as a branching reaction which readily occurs during a polycondensation reaction, the formation of foreign matter or deterioration in the apparatus at the time of molding can be suppressed effectively by using these alkali metal salts (co-catalyst) without impairing the rate of a terminal OH group capping reaction or polycondensation reaction.

The co-catalyst is preferably existent in an amount of 50 mols (atoms) or less in terms of elemental metal such as silicon, germanium or tin contained in the co-catalyst based on 1 mol (atom) of the elemental alkali metal contained in the polycondensation reaction catalyst. When the co-catalyst is used in an amount of more than 50 mols (atoms) in terms of the elemental metal, the polycondensation reaction rate slows down disadvantageously.

The co-catalyst is more preferably existent in an amount of 0.1 to 30 mols (atoms) in terms of the above elemental metal contained in the co-catalyst based on 1 mol (atom) of the elemental alkali metal contained in the polycondensation reaction catalyst.

A catalyst system using the co-catalyst has such an advantage that the polycondensation reaction and the terminal capping reaction can be promoted swiftly and thoroughly by using the co-catalyst in the polycondensation reaction. The co-catalyst can suppress an undesirable side-reaction such as a branching reaction which occurs in the polycondensation reaction system to a low level.

In the present invention, equipment and a process used for the production of a polycarbonate through an ester exchange reaction between an aromatic dihydroxy compound and a carbonic acid diester are not particularly limited, and conventionally known equipment and processes may be used. When the ester exchange reaction is carried out in a batch manner, two reactors are generally installed in series, an agitation tank equipped with a fractionating column is used as the former reactor and an agitation tank without a fractionating column is used as the latter reactor so that the reaction is carried out under different conditions. In this case, it is preferred to connect these tanks to each other by a pipe having a valve and to equip with a pump for transferring a reaction solution as required so that the reaction product of the former reactor is transferred to the latter reactor without being exposed to the outside air and the reaction is carried in the latter reactor until a desired degree of polymerization is achieved.

When the ester exchange reaction is carried out in a continuous matter, at least two reactors are generally installed in series, adjacent reactors are connected to each other by a pipe having a valve, equipped with a pump for transferring a reaction solution as required, it is used to continuously supply raw materials and a catalyst to the first reactor (while maintaining the reactors under different conditions), and discharge polycarbonate resens having a desired degree of polymerization from the last reactor while maintaining the reactors under different conditions.

The molar ratio of the carbonic acid diester to the aromatic dihydroxy compound is changed by the efficiency of the fractionating column, the reaction rate of the monomer in each of the reactors and the amount of the OH terminal groups of the polycarbonate to be obtained but it is generally 0.8 to 1.5, preferably 0.95 to 1.1, more preferably 1.0 to 1.05.

The materials of devices used in the equipment are not particularly limited but a material having a large iron content should be avoided and nickel and stainless steel are preferred.

A detailed description is subsequently given of the components to be added to the aromatic polycarbonate in the present invention.

The expression "components" means components to be added to and kneaded into an aromatic polycarbonate obtained by polymerization to produce a polymer suitable for obtaining a molded product of the aromatic polycarbonate. The components include (a) a compound which is chemically bonded to the main chain of the polymer, such as a terminal OH group capping agent, (b) a compound which acts on a component contained in the polymer other than a polymer to reduce, deactivate or change the function of the component, such as a catalyst deactivator, (c) a compound which is added to assist the removal of relatively volatile components such as an eliminated component (such as phenol), monomer and low-molecular weight oligomer contained in the polymer, such as a devolatilizing agent, and (d) resin additives which are added to improve the moldability of the aromatic polycarbonate and the physical and chemical properties of a molded product. These components will be described hereinunder.

(a) Terminal OH Group Capping Agent

The produced aromatic polycarbonate has an aromatic hydroxyl group or its derivative group derived from an aromatic diol compound which uses as a monomer in the melt polycondonsation. This terminal OH group is preferably capped for stability. The terminal OH group capping agent used for this purpose is an aromatic compound having a group which can react with the terminal OH group. Known compounds are used as the compound, as exemplified by the derivatives of aliphatic aryl carboxylates and aromatic aryl carboxylates and the derivatives of aliphatic aryl carbonates and aromatic aryl carbonates such as methoxycarbonyl phenyl phenyl carbonate and ethoxycarbonyl phenyl phenyl carbonate.

The terminal OH group capping agent is added in an amount of 0.3 to 2 mol equivalents based on 1 mol of the hydroxy terminal of the aromatic polycarbonate. When the amount of the terminal capping agent is smaller than 0.3 mol equivalent, a satisfactory terminal capping effect cannot be obtained and when the amount is larger than 2 mol equivalents, a surplus of the terminal capping agent remains in the aromatic polycarbonate, thereby reducing quality disadvantageously.

(b) Catalyst Deactivator

When a catalyst used for polymerization is contained in the aromatic polycarbonate while it retains its activity, it exerts an influence upon heat stability, color stability and hydrolysis resistance. Therefore, it is preferred to deactivate the residual polymerization catalyst.

Known catalyst deactivators for example, discribed in JP-A 8-59975 may be used effectively as the catalyst deactivator. Out of these, ammonium salts, phosphonium salts and esters of sulfonic acid are preferred. Illustrative examples of the catalyst deactivator include esters, ammonium salts and phosphonium salts of dodecylbezenesulfonic acid, esters, ammonium salts and phosphonium salts of paratoluenesulfonic acid, and esters, ammonium salts and phosphonium salts of benzenesulfonic acid. Out of these, tetrabutylphosphonium salts of dodecylbenzenesulfonic acid and tetrabutylammonium salts of paratoluenesulfonic acid are particularly preferred.

Preferred sulfonic acid esters include methyl benzenesulfonate, ethyl benzenesulfonate, butyl benzenesulfonate, octyl benzenesulfonate, phenyl benzenesulfonate, methyl paratoluenesulfonate, ethyl paratoluenesulfonate, butyl paratoluenesulfonate, octyl paratoluenesulfonate and phenyl paratoluenesulfonate.

The amount of the catalyst deactivator to be added to the aromatic polycarbonate is 0.5 to 50 equivalent, preferably 0.5 to 10 equivalent, more preferably 0.8 to 5 equivalent based on 1 equivalent of a polycondensation catalyst such as an alkali metal compound or alkali earth metal compound. This is equivalent to 0.01 to 500 ppm based on the aromatic polycarbonate.

The above catalyst deactivator may be directly kneaded into the aromatic polycarbonate or may be kneaded as a solution in a solvent. In this case, the solvent serves as a devolatilizing agent to help the removal of volatile components contained in the polymer.

The solvent used when the catalyst deactivator is kneaded into the aromatic polycarbonate is preferably water, saturated aliphatic hydrocarbon or aromatic hydrocarbon. Out of these, water is particularly preferred.

The saturated aliphatic hydrocarbon preferably has a boiling point at normal pressure of 30 to 270° C., preferably 50 to 200° C., more preferably 50 to 150° C.

Illustrative examples of the saturated aliphatic hydrocarbon include 2-methylbutane, pentane, 2,2-dimethylbutane, 2,3-dimethylbutane, hexane, 2-methylpentane, 3-methylpentane, 2,2-dimethylpentane, 2,3-dimethylpentane, 2,4-dimethylpentane, 3,3-dimethylpentane, heptane, 2-methylhexane, 3-methylhexane, 2,2,3-trimethylbutane, 2,2-dimethylhexane, 2,5-dimethylhexane, 3,4-dimethylhexane, hexamethylethane, 2-methylheptane, 4-methylheptane, octane, 2,2,4-trimethylpentane, 2,3,4-trimethylpentane, nonane, decane, undecane, dodecane, tridecane, tetradecane, 1-pentadecane and the like.

The aromatic hydrocarbon preferably has a boiling point at normal pressure of 80 to 270° C., preferably 80 to 200° C., more preferably 80 to 150° C.

Illustrative examples of the aromatic hydrocarbon include benzene, toluene, o-xylene, m-xylene, p-xylene, ethylbenzene, 2-ethyltoluene, 3-ethyltoluene, 4-ethyltoluene, cumene, mesitylene, propylbenzene, 1,2,3-trimethylbenzene, 1,2,4-trimethylbenzene, butylbenzene, sec-butylbenzene, tert-butylbenzene, o-cymene, m-cymene, p-cymene, 1,2-diethylbenzene, 1,4-diethylbenzene, 1,2,3,5-tetramethylbenzene, 1,2,4,5-tetramethylbenzene, amylbenzene, 4-tert-butyltoluene, (2,2-dimethylpropyl) benzene, isoamylbenzene, 5-tert-butyl-m-xylene, 1,3-diisopropylbenzene, 1,4-diisopropylbenzene, 1-phenylhexane, 1,2,4-trimethylbenzene, 1,3-di-tert-butylbenzene and the like.

Even when the added catalyst deactivator contains a volatile compound or forms a thermal decomposition product by thermal decomposition, they can be removed by evacuation at the same time.

(c) Devolatilizing Agent

Illustrative examples of the devolatilizing agent include water, nitrogen gas, the above saturated aliphatic hydrocarbon and the above aromatic hydrocarbon. Out of these, water is economically advantageous and particularly preferred.

Preferably, water used as the devolatilizing agent contains substantially no metal ions or chlorine ions. Stated more specifically, ion exchange water and distilled water are preferred.

Even when the above devolatilizing agent contains a volatile compound or forms a thermal decomposition product by thermal decomposition, they can be removed by evacuation at the same time.

The devolatilizing agent is added in an amount of 0.1 to 20 parts by weight based on 100 parts by weight of the aromatic polycarbonate. When the amount of the devolatilizing agent is smaller than 0.1 part by weight, the removal of volatile impurities becomes unsatisfactory and when the amount is larger than 20 parts by weight, the effect of removing impurities is not improved for that amount, which is economically disadvantageous.

(d) Resin Additives

The resin additives are added to the aromatic polycarbonate for specific purposes. The resin additives include, for example, a thermal stabilizer, optical stabilizer, epoxy compound, ultraviolet absorber, release agent, colorant, slip agent, antiblocking agent, lubricant, organic filler, inorganic filler and the like. Other polymers such as ABS resins and polyester resins may also be added.

Out of these, a thermal stabilizer, ultraviolet absorber, release agent and colorant are generally used and may be used in combination of two or more. Illustrative examples of these additives are given below.

Illustrative examples of the thermal stabilizer include phosphorus compounds, phenol-based stabilizers, organic thioether-based stabilizers, hindered amine-based stabilizers and the like.

The ultraviolet absorber is a general ultraviolet absorber exemplified by salicylic acid-based ultraviolet absorbers, benzophenone-based ultraviolet absorbers, benzotriazole-based ultraviolet absorbers, cyanoacrylate-based ultraviolet absorbers and the like.

The release agent is a generally known release agent exemplified by hydrocarbon-based release agents such as paraffins, fatty acid-based release agents such as stearic acid, fatty acid amide-based release agents such as stearic acid amide, alcohol-based release agents such as stearyl alcohol and pentaerythritol, fatty acid ester-based release agents such as glycerin monostearate and pentaerythritol, silicone-based release agents such as silicone oil, and the like.

The colorant is an organic or inorganic pigment or dye.

The above resin additives may be added to and kneaded into the aromatic polycarbonate directly or after they are dispersed or dissolved in a solvent as required.

In this respect, the solvent used for the addition and kneading of the additives is water, the above saturated aliphatic hydrocarbon or the above aromatic hydrocarbon.

Even when the additives contain a volatile compound or form a thermal decomposition product by thermal decomposition, they can be removed by evacuation at the same time.

The above additives may be added to and kneaded into the aromatic polycarbonate or other polymer as a composition containing them in high concentration (that is, master batch).

A general twin screw extruder has such a structure that a full-flight unit having a spiral blade for forwarding a resin is installed as a screw in the extruder to move a molten resin toward an outlet by the rotation of the screw. When the components are kneaded into the resin using such a twin screw extruder, a special screw constituent unit such as a material seal unit, neutral kneading unit or forward kneading unit must be installed as a part of the module to improve a kneading effect.

However, when such a special screw constituent unit such as a material seal unit, neutral kneading unit or forward kneading unit is installed, the resin filling rate markedly rises in the area of the constituent unit. When a full-flight unit is installed next to and on a downstream side of the constituent unit, the resin filling rate of a connection portion with the full-flight unit of the constituent unit or the constituent unit itself changes discontinuously. As a result, a dead space is formed at a site where the resin filling rate changes discontinuously, thereby causing residence deterioration such as the coloration, crosslinking or gelation of the resin and increasing the content of foreign matter in the resin.

The resin filling rate is determined by the throughput, revolution speed and the constitution of agitation elements of the twin screw extruder. A discontinuous change in the resin filling rate frequently occurs when a full-flight unit is installed next to and on a downstream side of a material seal unit, neutral kneading unit or forward kneading unit.

According to the present invention, by using an extruder in which a back kneading unit is installed at a position where the resin filling rate of the twin screw extruder described above changes discontinuously, the effect of eliminating a dead space can be obtained and a resin which is free from residence deterioration such as coloration, crosslinking or gelation and has an extremely small content of foreign matter can be produced.

A description is subsequently given of main units arranged in the twin screw extruder of the present invention.

As shown in FIG. 1(b), the back kneading unit used in the present invention consists of back kneading segments which are agitation elements constructed by combining together a plurality of flat plates having basically a spindle shape when seen from a transverse direction of the twin screw extruder.

It is preferred to combine together 2 or more, preferably 5 to 13 spindle-shaped flat plates.

The thickness of each of the spindle-shaped flat plates is preferably 0.05 to 0.5 time the diameter of the screw. Further, the ratio of the long axis to the short axis of the spindle shape is 1.1 to 2.0 and the maximum value of the long axis of the spindle shape is preferably 0.950 to 0.995 time the diameter of the cylinder body.

The spindle-shaped flat plates have the function of moving the resin in a backward direction. By providing this function to the spindle-shaped flat plates, the resin filling rate of the twin screw extruder is reduced not discontinuously but continuously and the effect of eliminating a dead space which is the effect of the present invention is obtained. When the spindle-shaped flat plates are outside the above ranges and the range of phase angle, their function of moving the resin in a backward direction is lost or unsatisfactory, whereby the resin filling rate of the twin screw extruder is reduced discontinuously, thereby making it impossible to eliminate a dead space, causing residence deterioration such as the coloration, crosslinking or gelation of the resin and increasing the content of foreign matter in the resin.

The seal ring unit (e) used in the present invention is basically constructed by fitting one circular flat plate onto each of left and right shafts but two or more flat plates may be fitted according to application purpose.

The thickness in the direction of the screw shaft of the circular flat plate is preferably 0.05 to 0.5 time the diameter of the screw. Further, the diameter of the circular flat plate is preferably 0.950 to 0.995 time the diameter of the cylinder body.

The neutral kneading unit (d) used in the present invention consists of neutral kneading segments constructed by combining together 2 or more, preferably 5 to 13 spindle-shaped flat plates. Since the spindle-shaped plates have a phase angle of 90°, they do not have the function of moving the resin.

The thickness in the direction of the screw shaft of each of the spindle-shaped flat plates of the neutral kneading unit is preferably 0.05 to 0.5 time the diameter of the screw. Further, the ratio of the long axis to the short axis of the spindle shape is 1.1 to 2.0 and the maximum value of the long axis of the spindle shape is preferably 0.950 to 0.995 time the diameter of the cylinder body.

The forward kneading unit (c) used in the present invention consists of forward kneading segments constructed by combining together 2 or more, preferably 5 to 13 spindle-shaped flat plates as well. The forward kneading unit has the function of moving the resin in the traveling direction of the resin due to the existence of a phase angle.

The thickness in the direction of the screw shaft of each of the spindle-shaped flat plates of the forward kneading unit is preferably 0.05 to 0.5 time the diameter of the screw. Further, the ratio of the long axis to the short axis of the spindle shape is 1.1 to 2.0 and the maximum value of the long axis of the spindle shape is preferably 0.950 to 0.995 time the diameter of the cylinder body.

As described above, the twin screw extruder of the present invention is aimed to add and knead the above components into the molten aromatic polycarbonate and a module consisting of some units having specific structures and functions is installed in the extruder.

The module installed in the extruder of the present invention has the function of causing the aromatic polycarbonate (may be simply referred to as "resin" hereinafter) to flow in the extruder while reducing the filling rate of the aromatic polycarbonate little by little not discontinuously but continuously and the function of eliminating a dead space from the extruder as much as possible, thereby suppressing residence deterioration such as the coloration, crosslinking or gelation of the resin and making it possible to obtain a high-quality resin which has an extremely small content of foreign matter.

In the present invention, the module has a supply port for supplying the components, a kneading area for substantially kneading the components and a vent area for discharging volatile components derived from the components added to the kneading area or contained in the resin from the extruder. The kneading area is located on an upstream side and the vent area is located on a downstream side.

One of the structural features of the module of the present invention is that the back kneading unit is located on an upstream side of the full-flight unit to prevent a discontinuous change (reduction) in the filling rate in each section of the resin. Typical one of the modules of the present invention (to be referred to as "module A" hereinafter) consists of a kneading unit, a material seal unit, a back kneading unit and a full-flight unit which are arranged from an upstream side to a downstream side of a flow of the resin.

Another typical module (to be referred to as "module B" hereinafter) consists of a neutral kneading unit or forward kneading unit, a back kneading unit and a full-flight unit which are arranged from an upstream side to a downstream side of a flow of the resin.

Still another module consists of a full-flight unit, a material seal unit, a back kneading unit and a full-flight unit. This module is preferably used, for example, when powdery components are added using a side feeder right after the vent area of the full-flight unit.

Figure 2:
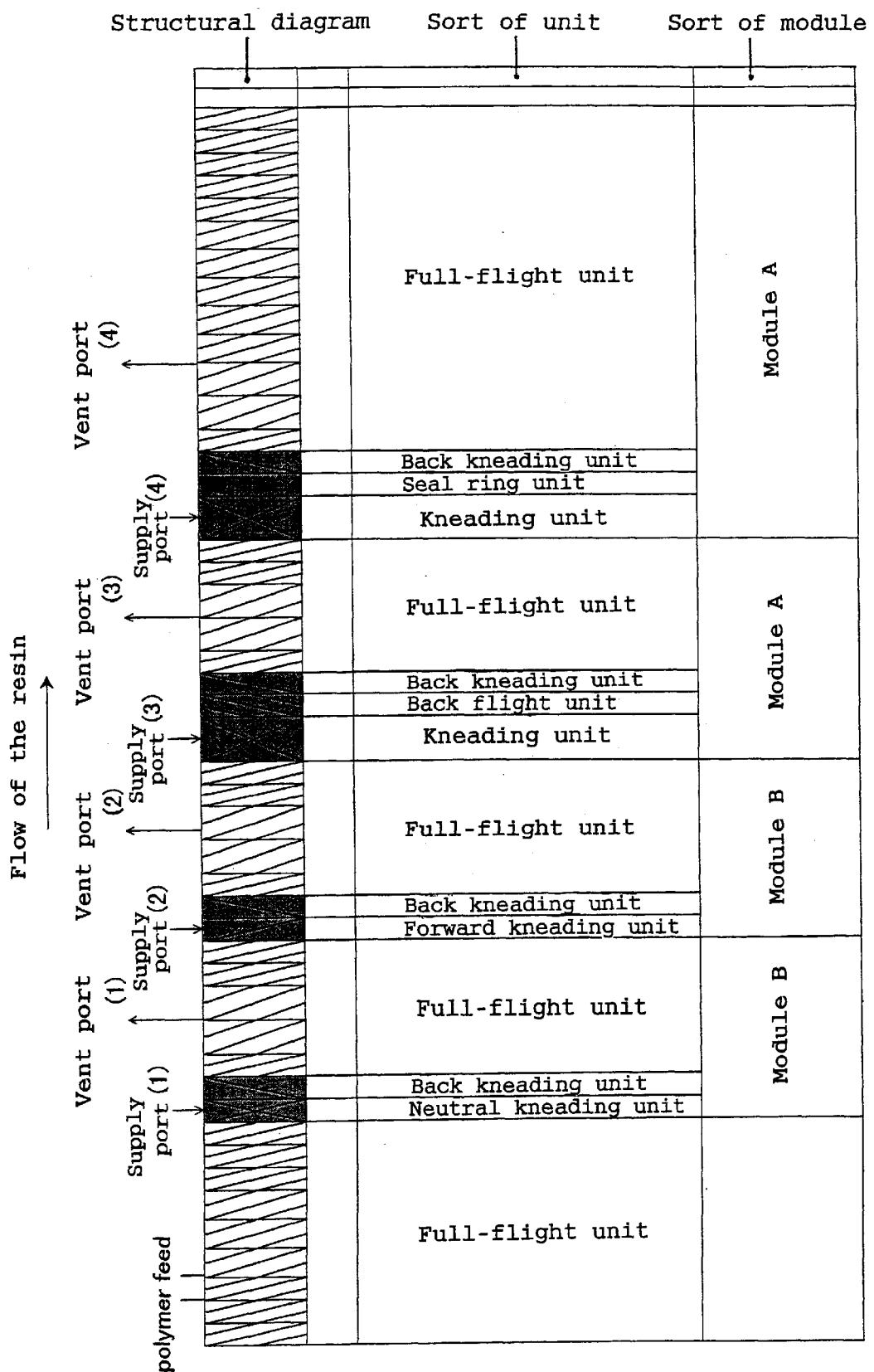
FIG. 2 is a structural diagram typically showing the arrangement of the modules of the twin screw extruder of the present invention.

The twin screw extruder of the present invention comprises at least 1, preferably 2 to 8 of the module A and the module B as main constituent elements. To help the understanding of the present invention, the structural diagram of the modules of the twin screw extruder of the present invention is shown in FIG. 2. FIG. 2 shows an extruder comprising two modules B and two modules A which are arranged from an upstream side to a downstream side of a flow of the resin. In FIG. 2, each module consists of 3 to 4 units and has a supply port for adding components to be kneaded and a vent port for discharging volatile components.

The number of modules and a combination of modules A and B in FIG. 2 are just for explanation and optionally changed in an actual process. The type of module is selected by the types and quantities of the components to be kneaded. The number of modules is at least 1, preferably 2 to 8, more preferably 3 to 7 from a practical point of view.

The concrete structure of each module, the supply of components to be kneaded and the discharge of volatile components from the vent port will be described in detail hereinunder.

Figure 1:
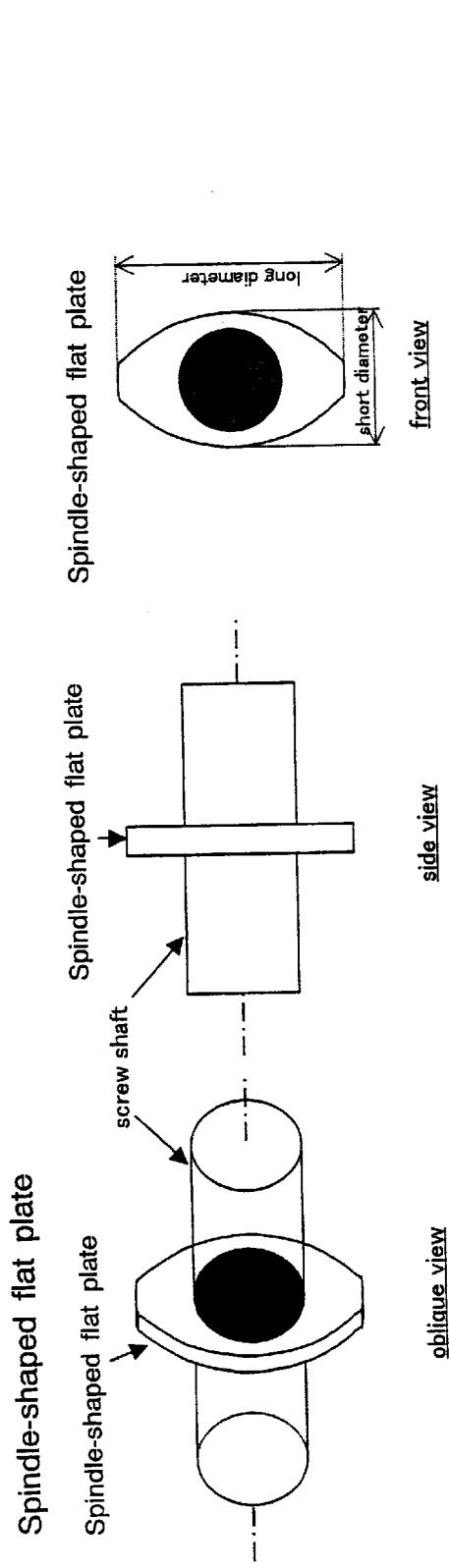
Figure 1:
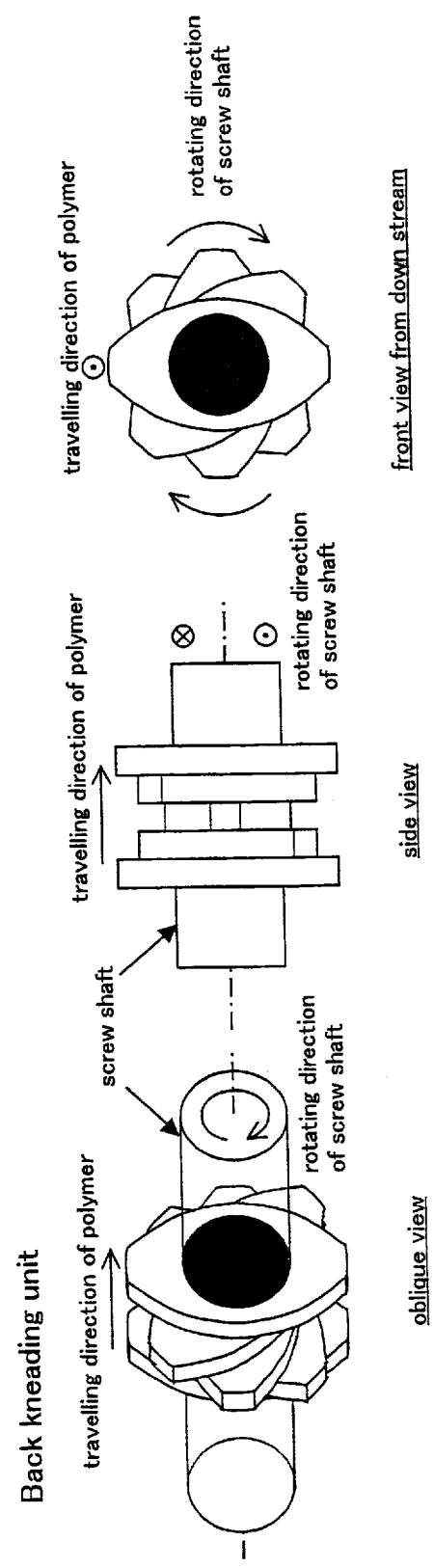
Figure 1:
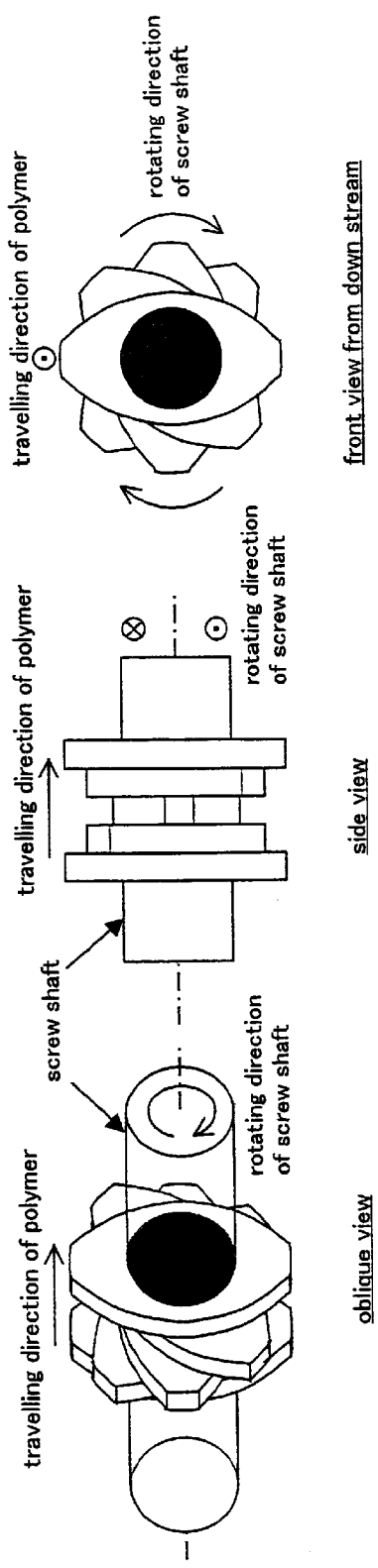
Figure 1:
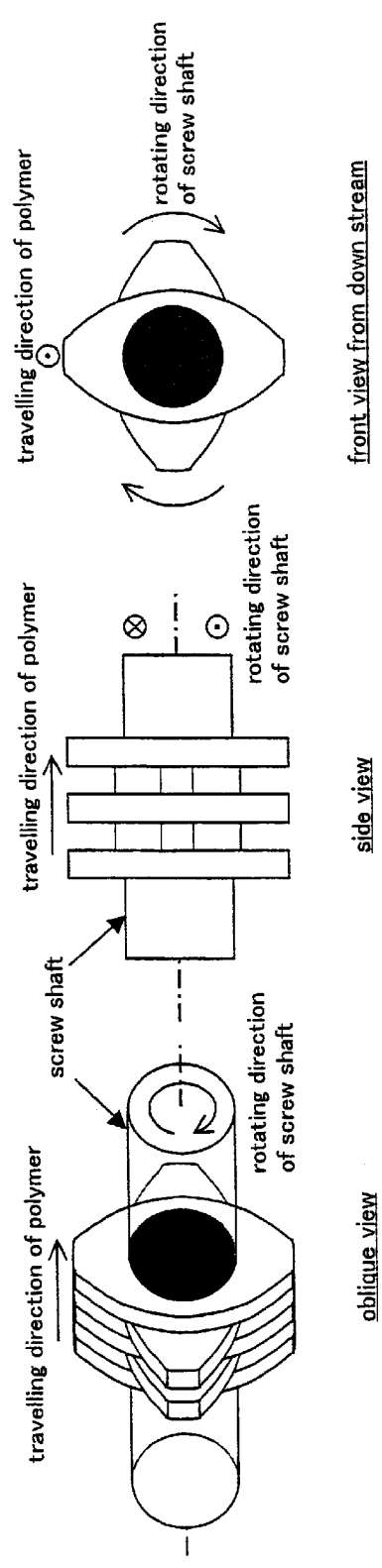
Figure 1:
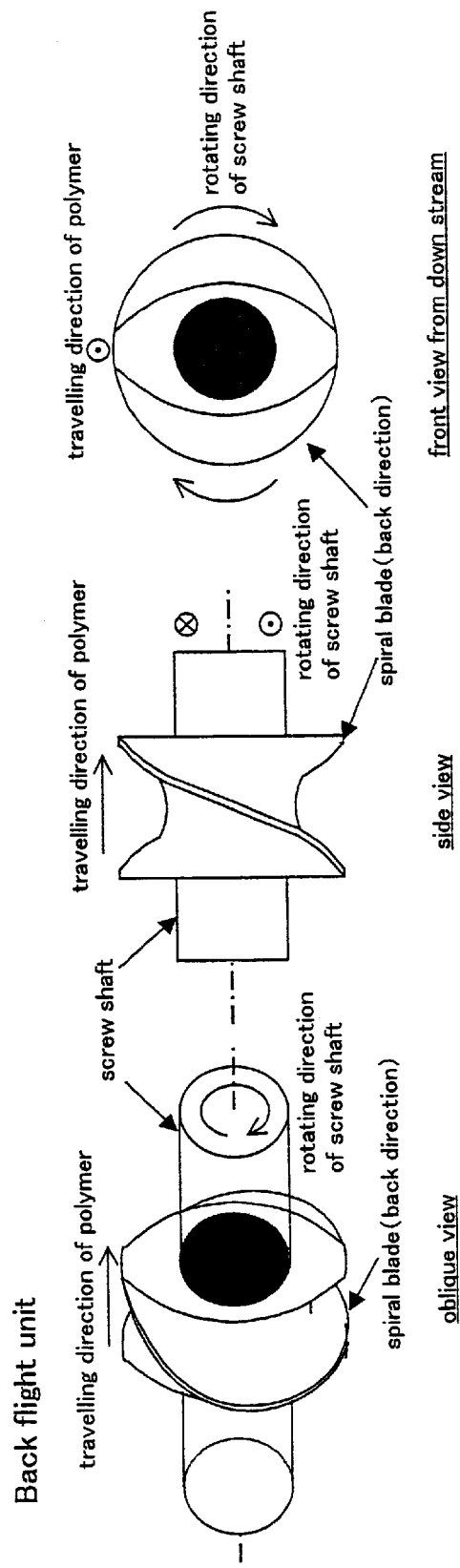

The module A in the present invention consists of a kneading unit, a material seal unit, a back kneading unit and a full-flight unit as described above. The kneading unit of the module A is an area where the components to be kneaded are added to and kneaded into the resin and selected from (b) a back kneading unit, (c) a forward kneading unit and (d) a neutral kneading unit shown in FIG. 1 according to the propose of this kneading unit. They may be used alone or in combination of two or three. The number of spindle-shaped flat plates constituting each of the units of FIGS. 1(b), 1(c) and 1(d) is 4 to 5. FIG. 1 shows the smallest number of spindle-shaped flat plates (segment). For example, the number of flat plates for each unit is 2 to 13, preferably 5 to 7.

The material seal unit of the module A can be (e) a seal ring unit or (g) a back flight unit but it is preferably (e) a seal ring unit.

In the module A, a back kneading unit and a full-flight unit are arranged on a downstream side of the material seal unit and a continuous reduction in the resin filling rate can be realized by combining these units. This full-flight unit has a vent port for discharging volatile components.

As described above, the module B of the present invention consists of a neutral kneading unit or forward kneading unit, a back kneading unit and a full-flight unit. The first unit (the most upstream side) of the module B is a neutral kneading unit or forward kneading unit. In the area of this unit, the components to be kneaded are added to and kneaded into the resin. The basic configurations of these units are shown in FIGS. 1(c) and 1(d). This first unit may be either one of a neutral kneading unit, a forward kneading unit and a combination thereof.

In the module B, a back kneading unit and a full-flight unit are arranged on a downstream side of the first unit and the residence deterioration of the resin is greatly suppressed by a combination of these units. The area of the full-flight unit on the most downstream side has a vent port.

According to the present invention, there is provided a method of adding and kneading components into an aromatic polycarbonate using a twin screw extruder comprising the above module A or B.

That is, according to the present invention, there is provided a method of kneading components into an aromatic polycarbonate using a twin screw extruder comprising at least one module A consisting of a kneading unit, a material seal unit, a back kneading unit and a full-flight unit which are arranged from an upstream side to a downstream side, the method comprising the steps of:

(1) supplying the components to the area of the kneading unit of the module of the twin screw extruder; and
(2) discharging volatile components from the area of the full-light unit of the module of the twin screw extruder as required.

Further, according to the present invention, there is provided a method of kneading components into an aromatic polycarbonate using a twin screw extruder comprising at least one module B consisting of a neutral kneading unit or forward kneading unit, a back kneading unit and a full-flight unit which are arranged from an upstream side to a downstream side, the method comprising the steps of:

(1) supplying the components to the area of the neutral kneading unit or the forward kneading unit of the module of the twin screw extruder; and
(2) discharging volatile components from the area of the full-light unit of the module of the twin screw extruder as required.

These methods of the present invention are industrially excellent as a method of adding and kneading components such as a terminal OH group capping agent, catalyst deactivator, devolatilizing agent and resin additives into an aromatic polycarbonate.

To carry out the method of the present invention, there are preferred modes of the supply conditions, supply means and kneading conditions of the components or the discharge conditions of the volatile components according to the addition purpose and types of the components. These preferred modes will be described hereinunder.

To knead the terminal OH group capping agent in accordance with the method of the present invention so as to carry out the terminal OH group capping reaction of the aromatic polycarbonate, the terminal OH group capping agent is supplied from the supply port of the kneading area of the module. As described above, the kneading area is the kneading unit of the module A or the neutral kneading unit or forward kneading unit of the module B. The module B is advantageously used to knead the terminal OH group capping agent.

Volatile components generated by the reaction of the terminal OH group capping agent are discharged from the vent area of the full-flight unit to the outside of the extruder by a vacuum pump or the like.

The temperature at the time of kneading the terminal OH group capping agent into the aromatic polycarbonate is 200 to 350° C. preferably 240 to 320° C. When the temperature is lower than 200° C., it is difficult to knead the aromatic polycarbonate with the terminal OH group capping agent and when the temperature is higher than 350° C., the terminal OH group capping agent itself volatilizes to the outside of the extruder, thereby greatly reducing reactivity and causing the thermal decomposition of the aromatic polycarbonate disadvantageously.

The pressure of the kneading area is $1.013 \times 10^5$ Pa or less, preferably $6.667 \times 10^4$ Pa or less. When the pressure is higher than $1.013 \times 10^5$ Pa, a by-product produced by the terminal OH group capping reaction cannot be removed from the extruder immediately and the decomposition of the aromatic polycarbonate occurs disadvantageously.

The time for kneading the aromatic polycarbonate with the terminal OH group capping agent is determined by the average residence time of the aromatic polycarbonate in the kneading area. In the case of an extruder having a plurality of kneading areas, the kneading time is expressed by the total of the kneading times of the plurality of kneading areas, generally 0.05 second or more, preferably 0.1 to 1,000 seconds. When the kneading time is shorter than 0.05 second, it is difficult to knead the aromatic polycarbonate with the terminal OH group capping agent and the terminal OH group capping reaction does not proceed.

The pressure of the vent area after the addition and kneading of the terminal OH group capping agent is $1.013 \times 10^5$ Pa or less, preferably $6.667 \times 10^4$ Pa or less. When the pressure of the vent area is higher than $1.013 \times 10^5$ Pa, the produced by-product cannot be removed from the extruder and the decomposition of the aromatic polycarbonate occurs disadvantageously.

The evacuation time of the vent area is determined by the average residence time of the aromatic polycarbonate in the vent area. In the case of an extruder having a plurality of vent areas, the evacuation time is expressed by the total of the evacuation times of the plurality of vent areas, preferably 0.05 second or more, particularly preferably 0.1 to 500 seconds. When the evacuation time is shorter than 0.05 second, the produced by-product cannot be removed from the extruder, the decomposition of the aromatic polycarbonate occurs, and the reaction by-product remains in the aromatic polycarbonate and reduces the quality of a final product.

When a plurality of modules are arranged in the extruder used, the terminal OH group capping agent can be divided into portions corresponding to the number of the modules and supplied to the modules.

According to the present invention, by employing preferred ranges of the above temperature and pressure of the kneading area, kneading time, the pressure and evacuation time of the vent area, and the sort and quantity of the terminal OH group capping agent, the decomposition of the aromatic polycarbonate caused by the reaction by-product can be suppressed, it is made easy to control the intrinsic viscosity of the finally produced aromatic polycarbonate, a terminal OH group capping reaction can be completed quickly, and an aromatic polycarbonate whose terminal is capped and which has an extremely small content of foreign matter can be produced.

Even when a catalyst deactivator is to be kneaded in accordance with the method of the present invention, the catalyst deactivator is supplied to the extruder from the kneading area of the module A or B. When a plurality of modules are arranged in the extruder, the catalyst deactivator can be divided into portions corresponding to the number of the modules and supplied to the modules. The catalyst deactivator may be kneaded into the aromatic polycarbonate directly or after it is formed into master pellets or dissolved or dispersed in an appropriate solvent.

The kneading of the catalyst deactivator is preferably carried out by using the module A and supplying the catalyst deactivator to the kneading unit of the module A.

The aromatic polycarbonate is kneaded with the catalyst deactivator at a temperature of 200 to 350° C., preferably 240 to 320° C. for 0.05 second or more, preferably 0.1 to 100 seconds. When the temperature is lower than 200° C., it is difficult to knead the aromatic polycarbonate with the catalyst deactivator and when the temperature is higher than 350° C., the thermal decomposition of the aromatic polycarbonate occurs disadvantageously.

When the catalyst deactivator is added as a solution, a solvent used in the solution serves as a devolatilizing agent to improve the effect of removing volatile components.

The vent area of the full-flight unit is evacuated by a vacuum pump or the like to remove the solvent and the volatile components from the extruder. The evacuation is carried out at a pressure of $1.013 \times 10^5$ Pa or less, preferably $6.667 \times 10^4$ Pa or less for 0.05 second or more, preferably 0.1 to 500 seconds. When the pressure of the vent area is higher than $1.013 \times 10^5$ Pa, the added solvent and the volatile components cannot be removed from the extruder.

The aromatic polycarbonate, which is produced by the melt method, obtained by kneading the catalyst deactivator in accordance with the present invention loses the activity of the residual catalyst and can be molded into a molded product having excellent stability.

The devolatilizing agent has the function of promoting the removal of volatile components such as an aromatic monohydroxy compound (such as phenol) by-produced in the production of the aromatic polycarbonate, raw materials (aromatic diol and carbonic acid diester) and a low molecular weight oligomer by vaporization under reduced pressure. When various components are kneaded, the devolatilizing agent has the function of removing volatile components generated from the used solvent or a kneading reaction.

The devolatilizing agent is supplied from the kneading area of the module A or B. That is, it is supplied from the kneading unit in the case of the module A and from the neutral kneading unit or forward kneading unit in the case of the module B. The devolatilizing agent may be divided into portions corresponding to the number of modules and supplied to the modules, which is more preferred than a case where the devolatilizing agent is kneaded at a time. The devolatilizing agent is preferably kneaded using the module A.

The devolatilizing agent is discharged from the vent port of the full-flight unit of the module under reduced pressure.

The aromatic polycarbonate is kneaded with the devolatilizing agent at a temperature of 200 to 350° C., preferably 240 to 320° C. and a pressure of 0.3 MPa or more, preferably 0.5 MPa or more. When the temperature is lower than 200° C., it is difficult to knead the aromatic polycarbonate with the devolatilizing agent and when the temperature is higher than 350° C., the thermal decomposition of the aromatic polycarbonate occurs disadvantageously.

In the present invention, the time for kneading the aromatic polycarbonate in the presence of the devolatilizing agent is determined by the average residence time of the aromatic polycarbonate in the kneading area. In the case of an extruder having a plurality of kneading areas, the time is expressed by the total of the average residence times of the plurality of kneading areas but preferably 0.05 to 100 seconds, particularly preferably 0.1 to 60 seconds. When the kneading time in the presence of the devolatilizing agent is below the above range, the removal of volatile components may be unsatisfactory and when the kneading time is above the range, it is economically disadvantageous.

The devolatilizing agent is discharged from the vent area of the full-flight unit of the module to the outside of the extruder by a vacuum pump together with the volatile components under reduced pressure. The pressure at this point is $1.013 \times 10^5$ Pa or less, preferably $6.667 \times 10^4$ Pa or less and the time is 0.05 second or more, preferably 0.1 to 500 seconds.

The resin additives may be kneaded into the aromatic polycarbonate directly or after they are formed into master pellets or dissolved or dispersed in an appropriate solvent. The resin additives are supplied to the kneading area of the kneading unit of the module A or B. It is preferred to supply the resin additives to the kneading area of the kneading unit of the module A. The resin additives may be each divided into portions and supplied from a plurality of modules, or the resin additives may be divided into groups and supplied from a plurality of modules separately.

The aromatic polycarbonate is kneaded with the resin additives at a temperature of 200 to 350° C., preferably 240 to 320° C. and a pressure of 0.3 MPa or more, preferably 0.5 MPa or more for 0.05 second or more, preferably 0.1 to 1,000 seconds. When the temperature is lower than 200° C., it is difficult to knead the aromatic polycarbonate with the resin additives and when the temperature is higher than 350° C., the thermal decomposition of the aromatic polycarbonate occurs disadvantageously.

The vent area of the full-flight unit of the module is preferably evacuated by a vacuum pump or the like to remove the solvent and volatile components from the extruder. The evacuation is carried out at a pressure of $1.013 \times 10^5$ Pa or less, preferably $6.667 \times 10^4$ Pa or less for 0.05 second or more, preferably 0.1 to 500 seconds. When the pressure of the vent area is higher than $1.013 \times 10^5$ Pa, the added solvent and the volatile components cannot be removed from the extruder.

Preferred modes of the method and conditions of kneading the components have been described. Each of the components may be kneaded independently, or mixtures of two or three of the components may be kneaded into the aromatic polycarbonate.

The inventors of the present invention have found that an aromatic polycarbonate having an extremely small content of volatile components is obtained unexpectedly by simple operation when water as a devolatilizing agent is kneaded into an aromatic polycarbonate using the twin screw extruder comprising a module(s) of the present invention under specific conditions and volatile components are discharged from the vent area.

The present inventors have also found that the content of volatile components contained in the aromatic polycarbonate can be significantly reduced and the effect of adding a catalyst deactivator can be further improved by supplying the catalyst deactivator together with water when water is kneaded under specific conditions in the above method and that the addition and kneading of water and the catalyst deactivator can be carried out in the same module.

According to the present invention, there is provided a method of removing volatile components from an aromatic polycarbonate as an improved method comprising the steps of kneading water into the aromatic polycarbonate at an absolute pressure of 0.3 to 10 MPa in the kneading area of the kneading unit of the module of a twin screw extruder comprising at least one module of the present invention and discharging and removing volatile components from the area of the full-flight unit of the module.

According to the present invention, there is also provided a method of kneading a mixed solution of water and a catalyst deactivator in place of water in the above method at an absolute pressure of 0.3 to 10 MPa as a further improved method.

A detailed description is subsequently given of these methods.

These methods area high-pressure water kneading method and characterized in that units on an upstream side and on a downstream side of the module are operated with a very large pressure difference between them because volatile components including water are discharged under reduced pressure from the full-flight unit arranged on a downstream side through the material seal unit and the back kneading unit.

It is assumed that the devolatilizing agent dispersed in the polymer uniformly in the kneading unit swells abruptly in the full-flight unit due to this large pressure difference and, result of it, the surface area of the polymer through which the volatile components contained in the polymer are evaporated is increased significantly, thereby promoting the removal of the volatile components.

Therefore, the use of the module A is advantageous for this high-pressure kneading method, a continuous reduction in the filling rate of the aromatic polycarbonate can be realized from the material seal unit to the full-flight unit regardless of the large pressure difference, and the generation of foreign matter can be suppressed.

In the above method, water is kneaded at an absolute pressure of 0.3 to 10 MPa, preferably 0.5 to 5 MPa, particularly preferably 1 to 2 MPa and a temperature of 200 to 350° C., preferably 220 to 300° C. The kneading time is 0.05 to 20 seconds, preferably 0.1 to 15 seconds per module. When a plurality of modules are used, the total kneading time is 0.05 to 100 seconds, preferably 0.1 to 60 seconds.

The proportion of water kneaded is 0.1 to 5 parts by weight, preferably 0.3 to 4 parts by weight based on 100 parts by weight of the aromatic polycarbonate per module.

Further, in the above method, a mixed solution of water and a catalyst deactivator can be kneaded directly without deactivating a catalyst in advance, and the deactivation of the catalyst and the removal of volatile components can be carried out in the same module.

In this case, it has been found that the decomposition of the polymer caused by water does not occur substantially because the deactivation of the catalyst takes place very quickly.

When a mixed solution of water and a catalyst deactivator is kneaded in this method, the pressure, temperature and kneading time are substantially the same as above. The proportion of water is also the same as above. The proportion of the catalyst deactivator contained in the mixed solution is 0.5 to 50 equivalent, preferably 0.5 to 10 equivalent, particularly preferably 0.8 to 5 equivalent based on 1 equivalent of a polymerization catalyst contained in the aromatic polycarbonate.

Under the above conditions, water or a mixed solution of water and a catalyst deactivator is supplied to the kneading area of the kneading unit of the module at a high pressure and kneaded into the aromatic polycarbonate, and volatile components including water are discharged from the vent area of the full-flight unit of the module to the outside of the extruder under reduced pressure. In this case, the pressure of the vent area is $1.333 \times 10$ Pa (0.1 mmHg) to $1.013 \times 10^5$ Pa (760 mmHg), preferably $1.333 \times 10^2$ Pa (I mmHg) to $6.667 \times 10^4$ Pa (500 mmHg).

The volatile components (especially raw material components, reaction by-product, solvent and the like) contained in the aromatic polycarbonate can be removed very effectively by the above improved method, and an aromatic polycarbonate which is excellent in thermal stability, color stability and hydrolysis resistance and has an extremely small content of these components can be obtained. Further, when the aromatic polycarbonate is kneaded with a catalyst deactivator together with water, a catalyst deactivating effect is improved together with the above effect and such an effect that the kneading step can be simplified can also be obtained.

When water is used as a devolatilizing agent in the present invention, water is discharged from the vent area of each module of the extruder to the outside of the extruder as water vapor by a vacuum pump together with the volatile components.

As means of collecting and separating the volatile components from water vapor containing the volatile components (low molecular weight substances) under reduced pressure, the following methods have been employed heretofore: one in which a plurality of heat exchangers or tanks having a cooling jacket and/or coil are used to cool low molecular weight substances to a temperature below their melting points under vacuum, condense them on the heat exchanging surface and collect them, a spare device is switched on when a pressure difference between inlet and outlet sides of the apparatus is caused by the adhesion of the low molecular weight substances, and washing by heating or with a solvent is carried out to remove the low molecular weight substances, and one in which a solvent which can dissolve generated low molecular weight substances is used as a scrubbing solution and contacted to the vapor of the low molecular weight substances to dissolve and collect the low molecular weight substances.

However, since the above methods which have been conventionally used require the switching and washing of the apparatus, complex equipment is required or a large amount of the solvent must be regenerated by distillation for the recycling of the scrubbing solution. Therefore, the above methods have such a problem that a great cost is required to collect low molecular weight substances under reduced pressure continuously and stably.

According to studies conducted by the present inventors, there has been found an inexpensive collection method which enables the operation of collecting low molecular weight substances under reduced pressure to be carried out easily and continuously.

That is, according to the present invention, there is provided a method of removing volatile components contained in an aromatic polycarbonate using a twin screw extruder and water as a devolatilizing agent, characterized in that a vacuum collection system comprising the following steps is installed between the vent port of the extruder and a vacuum pump:

1) the step of condensing water vapor and volatile components by introducing these vapor generated in the extruder into a scrubber which uses cool water as a scrubbing solution and contacting them to the cool water having a temperature below its boiling point at the operation pressure of the scrubber;
2) the step of separating solidified volatile components from the scrubbing solution containing the solidified volatile components discharged from the scrubber;
3) the step of cooling water from which the solidified volatile components have been separated to a temperature below its boiling point at the operation pressure of the scrubber; and
4) the step of circulating the cooled water to the scrubber.

In the above removing method, water as a devolatilizing agent to be kneaded in the extruder may contain not only water but also other components to be kneaded as described above, especially a mixed solution of a catalyst deactivator and water may be used.

As described above, when water is used as a component to be kneaded in the kneading method of the present invention, water is discharged from the vent area of the full-flight unit of each module to the outside of the extruder as water vapor by a vacuum pump under reduced pressure together with the volatile components.

The removing method of the present invention is a system for collecting volatile components from water vapor discharged from the full-flight unit of the extruder. This collection system will be described with reference to FIGS. 3 to 6 but it should be understood that the present invention is not limited by these figures.

The "vacuum pump" as used herein means a device for generating vacuum. Besides the vacuum pump shown in FIG. 3, an ejector or the like may also be used.

The expression "between a vapor line 9 and a vacuum pump 1" refers to between a vacuum line 2 for connecting the vent of a twin screw extruder 21 and a vapor line 9 for connecting the vacuum pump 1 shown in FIG. 3.

A scrubber 10 is arranged between the vacuum line 2 for connecting the vent of the twin screw extruder 21 and the vapor line 9 for connecting the vacuum pump 1.

A scrubber used in the present invention is not particularly limited and any structured scrubber may be used if it can contact the scrubbing solution to vapor well and has a small pressure loss. An example of the scrubber is shown in FIG. 4.

In FIG. 4, reference numeral 10 denotes a cylindrical vertical column (scrubber body) installed upright, a plurality of spray nozzles 3 are installed in a center portion in a sectional direction of the column 10 at different heights, and a required amount of the scrubbing solution is sprayed from the spray nozzles 3.

An inlet 5 for introducing gas containing water vapor discharged from the twin screw extruder is provided on the side wall of the column 10 so that the vapor of volatile components introduced into the column from the inlet 5 is contacted to the scrubbing solution to be solidified by cooling and removed.

The vapor of water used as a devolatilizing agent is liquefied and contained in the scrubbing solution. Gas from which water vapor and the vapor of the volatile components have been removed is introduced into the vacuum pump 1 from an outlet 4 for the vacuum line provided at the top of the column 10 and discharged.

Care must be taken to protect the inlet 5 from spray of the scrubbing solution.

The scrubbing solution containing the collected solidified volatile components, water used as a devolatilizing agent and water-soluble volatile components is discharged from an outlet 6 provided at a lower portion of the column.

In the removing method of the present invention, since the scrubbing solution contains water as a devolatilizing agent, the scrubbing solution discharged from the scrubber becomes a water slurry containing the collected solid volatile components. The slurry is introduced into a scrubbing solution storage tank 7 through a scrubbing solution line 11.

The scrubbing solution storage tank 7 is preferably equipped with an agitator to prevent the sedimentation of the slurry.

Figure 6:
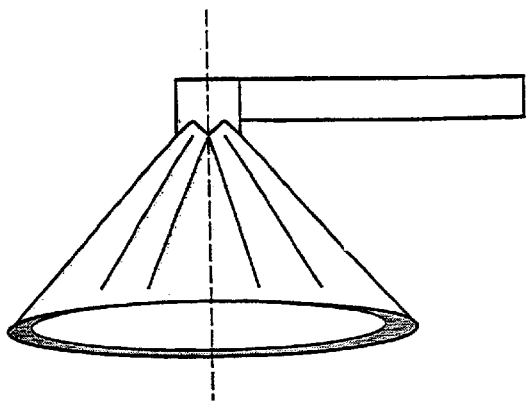
FIG. 6 is a diagram showing the form of conical spray whose inside is hollow (hollow conical spray).

When the above scrubber is used, the spray nozzle used is preferably a full cone nozzle having sprayed liquid drops inside a spray cone as shown in FIG. 5 or a hollow cone nozzle whose inside is hollow as shown in FIG. 6. Out of these, the full cone nozzle is the most preferred.

The flow rate of the scrubbing solution is preferably 100 to 1,000 times the total weight of water vapor and the gases of volatile components discharged from the twin screw extruder.

The temperature of water used as the scrubbing solution must be controlled to a temperature below its boiling point at the collection pressure of the scrubber. When the temperature is higher than the boiling point, it is difficult to maintain a degree of vacuum required for evacuation due to the vaporization of the scrubbing solution and the volatile components distill out into the vacuum pump disadvantageously. The temperature is desirably controlled to a temperature 5° C. lower than the boiling point of water at the collection pressure from the view point of collection efficiency.

It is desirable to always maintain the vapor line 9 for connecting the twin screw extruder 21 to the spray nozzle 3 and the inlet 5 for the vapor line provided in the scrubber shown in FIG. 3 at a temperature of 100° C. or more by a heating medium such as steam or a heating unit such as a jacket to prevent the adhesion of volatile components (low molecular weight substances).

The installation angle 8 of the inlet 5 shown in FIG. 4 for introducing vapor into the scrubber is preferably 45 to 80° from a vertical direction so that the nozzle descends toward the scrubber.

When low molecular weight substances adhere to the inner wall of the scrubber column, a spray nozzle for cleaning the adhered portions may be provided to forcedly clean with spray.

In the scrubber and the scrubbing solution line 11 shown in FIG. 3 for connecting the scrubber to the scrubbing solution storage tank, it is desirable not to make a portion having a diameter which greatly differs from that of other portion because it becomes resistance against a flow of the scrubbing solution containing discharged solid volatile components. When such a portion is made, the restriction angle is preferably set to 10° or less.

As shown in FIG. 4, the scrubbing solution containing the collected solids in the scrubbing solution storage tank 7 is introduced into a separator 14 for removing the collected solids contained in the scrubbing solution by a scrubbing solution pump 13.

A method of separating solidified volatile components is not particularly limited and any methods are acceptable if they can remove solids contained in the scrubbing solution efficiently and thoroughly. Out of these, a method which separates solids by centrifugation or filtration is preferred.

An apparatus for separating solids by centrifugation is not particularly limited and centrifugal separators available on the market may be used, as exemplified by horizontal continuous centrifugal separators and semi-continuous centrifugal separators having a vertical inner screen.

An apparatus for separating solids by filtration is not particularly limited but continuous filters such as a belt filter and drum filter, cartridge filters, basket type filters, strainers and the like may be used. These devices may be used in combination as required.

As for the collection accuracy of solids contained in the scrubbing solution, the mesh of the filter is 10 μm or less. That is, 90% or more of particles of 10 μm in diameter are preferably collected, and 90% or more of particles of 2 μm in diameter are more preferably collected. When a device which cannot carry out solid-liquid separation thoroughly is used, undissolved solids are adhered to the inner surface of a scrubbing solution line 16 and the inside of other devices, thereby preventing long-time continuous operation.

It is preferred to set the flow rates of scrubbing solution lines 12 and 15 between the scrubbing solution storage tank and the solid-liquid separator to 1 m/s or more so as to prevent the adhesion of solids to the inner surfaces of the lines and to eliminate the resistance (part) such as an unneeded curved portion on the like as much as possible so as to reduce the flow resistance.

After the above solid-liquid separator, it is preferred to discharge a surplus of water from the collection system and to treat a waste water treatment as required in order to suppress an increase in the amount of the scrubbing solution caused by water used as a devolatilizing agent.

To recycle water from which solidified volatile components have been removed as the scrubbing solution, the water is cooled to a predetermined temperature below its boiling point at the operation pressure of the scrubber by a scrubbing solution cooler 18. A device used for this purpose is not particularly limited and a cooling jacket and/or coil is installed in the above scrubbing solution storage tank 7 having a stirrer, or a heat exchanger such as a multi-tube heat exchanger, plate type heat exchanger or scraping type heat exchanger may be used.

A device for circulating cooled water to the scrubber is a line for connecting the above solution cooler 18 and the spray nozzle of the scrubber consisting of a flow meter 19 and a scrubbing solution line equipped with an automatic valve for the control of flow rate. An undesired curved portion is eliminated as much as possible to prevent pressure resistance in the scrubbing solution line 16.

Not only smooth continuous long-time operation is made possible but also labor and energy required during operation can be greatly reduced by the vapor collecting method of the present invention.

Since water which is a devolatilizing agent is used as the scrubbing solution, compared with a case where other organic solvent or the like is used as a scrubbing solution, the process of collecting a devolatilizing agent can be greatly simplified and recycling can be carried out with ease because volatile components collected by a filter or the like are not subjected to a heat treatment or solvent treatment.

The present invention is applied to an aromatic polycarbonate. However, the present invention can also be applied to other resin which may suffer residence deterioration such as coloration, crosslinking or gelation. The effect of the present invention is large for commonly used thermoplastic resins, particularly polyethylene, polystyrene, polyvinyl chloride, polyamides and polyesters which readily suffer residence deterioration such as coloration, crosslinking or gelation. However, out of these, aromatic polycarbonates are very sensitive to residence deterioration such as coloration, crosslinking or gelation and the utility values of the apparatus and method of the present invention are particularly large.

EXAMPLES

Examples of the present invention are given below. These examples are provided for the purpose of further illustrating the present invention but are in no way to be taken as limiting.

"%" and "parts" in the examples mean "% by weight" and "parts by weight", respectively, unless otherwise stated. The physical properties of aromatic polycarbonates obtained in the following examples were measured as follows.

(1) Intrinsic Viscosity and Viscosity Average Molecular weight

The intrinsic viscosity of a methylene chloride solution having a concentration of 0.7 g/dl was measured using an Ubbellohde viscometer and the viscosity average molecular weight was obtained from the following equation.

$$[\eta]=1.23\times10^{-4}M^{0.83}$$

(2) Number of Foreign Substances 100 g of a polycarbonate was dissolved in 1 liter of a methylene chloride solution, the resulting solution was filtered with the filter which has 30 μm diameter's poses, and the number of foreign substances remaining on the filter was counted through a microscope.

(3) Amount of Volatile Components

Phenol and diphenyl carbonate contained in a solution of 100 g of a polycarbonate dissolved in 1 liter of methylene chloride were extracted with acetonitrile and determined by the high-speed liquid chromatography of Toso Co., Ltd.

(4) Pellet Color

Measured with the color difference meter of Nippon Denshoku Kogyo Co., Ltd.

Example 1

2,2-bis(4-hydroxyphenyl)propane and diphenyl carbonate were charged into a dissolution tank equipped with a stirrer in a molar ratio of 1:1.02 and dissolved at 150° C. after the inside of the tank was substituted by nitrogen, and the mixed solution was transferred to a raw material storage tank maintained at 150° C.

Thereafter, the mixed solution was supplied continuously to a vertical agitation tank equipped with a fractionating column and maintained at an inner temperature of 220° C. and an inner pressure of 13,333 Pa (100 mmHg), a disodium salt of bisphenol A and tetramethyl ammonium hydroxide were added continuously in amounts of $5\times10^{-7}$ equivalent and $1\times10^{-4}$ equivalent based on 1 mol of 2,2-bis(4-hydroxyphenyl)propane, respectively, and a reaction was carried out by removing the formed phenol from the fractionating column. The obtained reaction product (1) was discharged continuously using a gear pump.

The reaction product (1) was supplied continuously to a vertical agitation tank equipped with a fractionating column maintained at an inner temperature of 250° C. and an inner pressure of 1,333 Pa (10 mmHg). A reaction was carried out by removing the formed phenol from a fractionating column. The obtained reaction product (2) was discharged continuously using a gear pump.

The reaction product (2) was then supplied continuously to a horizontal reactor maintained at an inner temperature of 270° C. and an inner pressure of 133 Pa (1 mmHg). An aromatic polycarbonate having a viscosity average molecular weight of 15,300 was obtained continuously by further carrying out polymerization while the formed phenol was removed from the reaction system.

The aromatic polycarbonate was then supplied continuously to an intermeshing twin screw extruder. In the twin screw extruder, a catalyst deactivator (tetrabutyl phosphonium salt of dodecylbenzenesulfonic acid) was added and kneaded in an equivalent amount 2 times that of a disodium salt of bisphenol A used as a polymerization catalyst to deactivate the polymerization catalyst and a devolatilizing agent (water) was added in an amount of 1 wt % based on the polycarbonate to remove volatile components so as to obtain a stabilized aromatic polycarbonate continuously. The aromatic polycarbonate in a molten state was extruded from a dice and pelletized by a pelletizer to obtain an aromatic polycarbonate as a final product.

The addition and kneading of the catalyst deactivator and the removal of volatile components were both carried out using a module (A) consisting of a forward kneading unit, a neutral kneading unit, a back kneading unit, a seal ring unit, a back kneading unit and a full-flight unit which were arranged from an upstream side, and the above additives were supplied to the forward kneading unit.

The forward kneading unit used was constructed by combining together 5 or more spindle-shaped flat plates, and the thickness in a screw shaft direction of each of the spindle-shaped flat plates was 0.1 time the diameter of the screw. Further, the ratio of the long axis to the short axis of the spindle shape was 1.614, and the maximum value of the long axis of the spindle shape was 0.979 time the diameter of the cylinder body. The spindle-shaped flat plates were combined together in a traveling direction of the aromatic polycarbonate at a phase angle of 45° in a positive direction when the rotation direction of the shaft was positive.

The neutral kneading unit used was constructed by combining together 5 or more spindle-shaped flat plates, and the thickness in a screw shaft direction of each of the spindle-shaped flat plates was 0.1 time the diameter of the screw. Further, the ratio of the long axis to the short axis of the spindle shape was 1.614, and the maximum value of the long axis of the spindle shape was 0.979 time the diameter of the cylinder body.

The back kneading unit used was constructed by combining together 5 or more spindle-shaped flat plates, and the thickness in a screw shaft direction of each of the spindle-shaped flat plates was 0.1 time the diameter of the screw. Further, the ratio of the long axis to the short axis of the spindle shape was 1.614, and the maximum value of the long axis of the spindle shape was 0.979 time the diameter of the cylinder body. The spindle-shaped flat plates were combined together in a traveling direction of the aromatic polycarbonate at a phase angle of 45° in a negative direction when the rotation direction of the shaft was positive.

The seal ring unit used was constructed by fitting one circular flat plate onto each of the right and left shafts, and the thickness in a screw shaft direction of the circular flat plate was 0.1 time the diameter of the screw. The diameter of the circular flat plate was 0.979 time the diameter of the cylinder body.

When the screw shaft was observed with the naked eye after 40 days of operation, it retained metallic luster before operation and the adhesion of foreign matter such as a carbonized material was not seen. Further, the maximum number of foreign substances contained in the aromatic polycarbonate as a final product was 41 during operation.

Example 2

The addition and kneading of a terminal OH group capping agent (2-methoxycarbonyl phenyl phenyl carbonate) and a catalyst deactivator (tetrabutyl phosphonium salt of dodecylbenzenesulfonic acid) were carried out in the twin screw extruder. An aromatic polycarbonate was obtained in the same manner as in Example 1 except that a module (B) used to add and knead the terminal OH group capping agent consisted of a neutral kneading unit, a back kneading unit and a full-flight unit which were arranged from an upstream side and a module (A) used to add and knead the catalyst deactivator consisted of a forward kneading unit, a back kneading unit, a back flight unit, a back kneading unit and a full-flight unit which were arranged from an upstream side.

When the screw shaft was observed with the naked eye after 40 days of operation, it retained metallic luster before operation and the adhesion of foreign matter such as a carbonized material was not seen. Further, the maximum number of foreign substances contained in the aromatic polycarbonate as a final product was 39 during operation.

Example 3

The addition and kneading of a terminal OH group capping agent (2-methoxycarbonyl phenyl phenyl carbonate) and a catalyst deactivator (tetrabutyl phosphonium salt of dodecylbenzenesulfonic acid) were carried out in the twin screw extruder. An aromatic polycarbonate was obtained in the same manner as in Example 1 except that a module (B) used to add and knead the terminal OH group capping agent consisted of a forward kneading unit, a back kneading unit and a full-flight unit which were arranged from an upstream side and a module (A) used to add and knead the catalyst deactivator consisted of a forward kneading unit, a back kneading unit, a back flight unit, a back kneading unit and a full-flight unit which were arranged from an upstream side.

When the screw shaft was observed with the naked eye after 40 days of operation, it retained metallic luster before operation and the adhesion of foreign matter such as a carbonized material was not seen. Further, the maximum number of foreign substances contained in the aromatic polycarbonate as a final product was 44 during operation.

Example 4

The addition and kneading of a catalyst deactivator (tetrabutyl phosphonium salt of dodecylbenzenesulfonic acid) and an additive (glycerin monostearate) were carried out in the twin screw extruder. An aromatic polycarbonate was obtained in the same manner as in Example 1 except that a module (A) used to add and knead the catalyst deactivator consisted of a forward kneading unit, a back kneading unit, a seal ring unit, a back kneading unit and a full-flight unit which were arranged from an upstream side and a module (B) used to add and knead the additive consisted of a forward kneading unit, a back kneading unit and a full-flight unit which were arranged from an upstream side.

When the screw shaft was observed with the naked eye after 40 days of operation, it retained metallic luster before operation and the adhesion of foreign matter such as a carbonized material was not seen. Further, the maximum number of foreign substances contained in the aromatic polycarbonate as a final product was 41 during operation.

Example 5

The addition and kneading of a catalyst deactivator (tetrabutyl phosphonium salt of dodecylbenzenesulfonic acid) and the addition and kneading of an additive master powder (4,4'-biphenylenediphosphinic acid(2,4-di-t-butylphenyl)) with the aid of a side feeder were carried out in the twin screw extruder. A module (A) used to add and knead the catalyst deactivator consisted of a forward kneading unit, a back kneading unit, a seal ring unit, a back kneading unit and a full-flight unit which were arranged from an upstream side, a module (C) used to add and knead the additive master powder consisted of a full-flight unit, a back flight unit, a back kneading unit and a full-flight unit which were arranged from an upstream side, and a kneading and vent zone consisting of a forward kneading unit, a neutral kneading unit, a back kneading unit and a full-flight unit was provided after the module (C). An aromatic polycarbonate was obtained in the same manner as in Example 1 except that the additive master powder was added to the second full-flight unit of the module (C).

When the screw shaft was observed with the naked eye after 40 days of operation, it retained metallic luster before operation and the adhesion of foreign matter such as a carbonized material was not seen. Further, the maximum number of foreign substances contained in the aromatic polycarbonate as a final product was 39 during operation.

Comparative Example 1

The addition and kneading of a catalyst deactivator (tetrabutyl phosphonium salt of dodecylbenzenesulfonic acid) and a devolatilizing agent (water) were carried out in the twin screw extruder. An aromatic polycarbonate was obtained in the same manner as in Example 1 except that a module used to add and knead the catalyst deactivator and the devolatilizing agent (water) consisted of a forward kneading unit, a neutral kneading unit, a back kneading unit, a seal ring unit and a full-flight unit which were arranged from an upstream side.

When the screw shaft was observed with the naked eye after 40 days of operation, the adhesion of a carbonized material was seen in the boundary between the seal ring unit and the full-flight unit on a downstream side. Further, the maximum number of foreign substances contained in the aromatic polycarbonate as a final product was 100 or more during operation.

Comparative Example 2

The addition and kneading of a terminal OH group capping agent (2-methoxycarbonyl phenyl phenyl carbonate) and a catalyst deactivator (tetrabutyl phosphonium salt of dodecylbenzenesulfonic acid) were carried out in the twin screw extruder. An aromatic polycarbonate was obtained in the same manner as in Example 1 except that a module used to add and knead the terminal OH group capping agent consisted of a neutral kneading unit and a full-flight unit which were arranged from an upstream side and a module used to add and knead the catalyst deactivator consisted of a forward kneading unit, a back kneading unit, a back flight unit and a full-flight unit which were arranged from an upstream side.

When the screw shaft was observed with the naked eye after 40 days of operation, the adhesion of a carbonized material was seen in the boundary between the surface of the neutral kneading unit of the kneading area of the terminal OH group capping agent and the full-flight unit on a downstream side. The adhesion of a carbonized material was also seen in the boundary between the back flight unit of the addition and kneading area of the catalyst deactivator and the full-flight unit on a downstream side. Further, the maximum number of foreign substances contained in the aromatic polycarbonate as a final product was 100 or more during operation.

Comparative Example 3

The addition and kneading of a terminal OH group capping agent (2-methoxycarbonyl phenyl phenyl carbonate) and a catalyst deactivator (tetrabutyl phosphonium salt of dodecylbenzenesulfonic acid) were carried out in the twin screw extruder. An aromatic polycarbonate was obtained in the same manner as in Example 1 except that a module used to add and knead the terminal OH group capping agent consisted of a forward kneading unit and a full-flight unit which were arranged from an upstream side and a module used to add and knead the catalyst deactivator consisted of a forward kneading unit, a back kneading unit, a back flight unit and a full-flight unit which were arranged from an upstream side.

When the screw shaft was observed with the naked eye after 40 days of operation, the adhesion of a carbonized material was seen in the boundary between the surface of the forward kneading unit of the kneading area of the terminal OH group capping agent and the full-flight unit on a downstream side. The adhesion of a carbonized material was also seen in the boundary between the back flight unit of the addition and kneading area of the catalyst deactivator and the full-flight unit on a downstream side. Further, the maximum number of foreign substances contained in the aromatic polycarbonate as a final product was 100 or more during operation.

Example 6

2,2-bis(4-hydroxyphenyl)propane and diphenyl carbonate were charged into a dissolution tank equipped with a stirrer in a molar ratio of 1:1.02 and dissolved after the inside of the tank was substituted by nitrogen.

Thereafter, the mixed solution was supplied continuously to a vertical agitation tank equipped with a fractionating column and maintained at an inner temperature of 220° C. and an inner pressure of $1.333 \times 10^4$ Pa (100 mmHg), a disodium salt of bisphenol A and tetramethyl ammonium hydroxide were added continuously in amounts of $5 \times 10^7$ equivalent and $1 \times 10^4$ equivalent based on 1 mol of 2,2-bis(4-hydroxyphenyl)propane, respectively, and a reaction was carried out by removing the formed phenol from the fractionating column. The obtained reaction product (1) was discharged continuously using a gear pump.

The reaction product (1) was then supplied continuously to a vertical agitation tank equipped with a fractionating column maintained at an inner temperature of 250° C. and an inner pressure of $1.333 \times 10^3$ Pa (10 mmHg). A reaction was carried out by removing the formed phenol from the fractionating column. The obtained reaction product (2) was discharged continuously using a gear pump.

The reaction product (2) was then supplied continuously to a horizontal reactor maintained at an inner temperature of 270° C. and an inner pressure of $1.333 \times 10^2$ Pa (1 mmHg). A polycarbonate having a viscosity average molecular weight of 15,300 was obtained continuously by further carrying out polymerization while the formed phenol was removed from the system. This polycarbonate contained 170 ppm of phenol and 250 ppm of diphenyl carbonate.

This polycarbonate was then supplied continuously in a molten state to an intermeshing twin screw extruder comprising 4 modules each of which has a solution adding and kneading area and a vent area. A tetrabutyl phosphonium salt of dodecylbenzenesulfonic acid was added to and kneaded into the polycarbonate continuously as a 0.02 wt % aqueous solution in an amount of 2 equivalent based on 1 equivalent of a disodium salt of bisphenol A (2 mols based on 1 equivalent of a disodium salt of bisphenol A) used as a polymerization catalyst in the solution adding and kneading area of the first module at a pressure of 1.5 MPa, water was removed from the vent of the first module maintained at a pressure of $2.0 \times 10^3$ Pa (15 mmHg) to deactivate the polymerization catalyst, and part of volatile components contained in the polymer was removed. Thereafter, water was added continuously to the solution adding and kneading areas of the second to fourth modules in an amount of 1 wt % based on 100 parts by weight of the polycarbonate per unit module at a pressure of 1.5 MPa and kneaded in the four modules for a total time of 20 seconds. Volatile components contained in the polycarbonate were removed by reducing the pressure of the vent area right after each of the solution adding and kneading areas to $2.0 \times 10^3$ Pa (15 mmHg), and the obtained polycarbonate was extruded from a dice and then pelletized by a pelletizer to obtain a polycarbonate as a final product.

The measurement results of the amounts of the residual phenol and diphenyl carbonate contained in the obtained polycarbonate and the viscosity average molecular weight and color b value of the polycarbonate are shown in Table 1.

Examples 7 to 16

Polycarbonates were obtained in the same manner as in Example 6 except that the kneading pressure was changed in Examples 7 and 8, the kneading time was changed in Examples 9 and 10, the amount of water was changed in Examples 11 and 12, the resin temperature was changed in Examples 13 and 14, and the vent pressure was changed in Examples 15 and 16 as shown in Table 1. The measurement results of the amounts of the residual phenol and diphenyl carbonate contained in the obtained polycarbonate and the viscosity average molecular weight and color b value of the polycarbonate are shown in Table 1.

TABLE 1

| | | Ex. 6 | Ex. 7 | Ex. 8 | Ex. 9 | Ex. 10 | Ex. 11 |
|---|---|---|---|---|---|---|---|
| amount of catalyst (Note 1) | disodium salt of bisphenol A (equivalent) | $5 \times 10^{-7}$ | $5 \times 10^{-7}$ | $5 \times 10^{-7}$ | $5 \times 10^{-7}$ | $5 \times 10^{-7}$ | $5 \times 10^{-7}$ |
| | tetramethyl ammonium hydroxide (equivalent) | $1 \times 10^{-4}$ | $1 \times 10^{-4}$ | $1 \times 10^{-4}$ | $1 \times 10^{-4}$ | $1 \times 10^{-4}$ | $1 \times 10^{-4}$ |
| amount of catalyst deactivator (Note 2) | tetrabutylphosphonium salt of dodecylbenzenesulfonic acid (equivalent) | 2 | 2 | 2 | 2 | 2 | 2 |
| operation conditions of twin screw extruder | kneading pressure (MPa) | 1.5 | 0.5 | 3 | 1.5 | 1.5 | 1.5 |
| | kneading time (seconds) | 20 | 20 | 20 | 10 | 30 | 20 |
| | amount of water (wt %) (Note 3) | 1 | 1 | 1 | 1 | 1 | 0.5 |
| | resin temperature (° C.) | 290 | 290 | 290 | 290 | 290 | 290 |
| | vent pressure (× 1000 Pa) | 2 | 2 | 2 | 2 | 2 | 2 |
| experimental results | viscosity average molecular weight | 15300 | 15300 | 15200 | 15300 | 15100 | 15300 |
| | color b value | 0.4 | 0.4 | 0.5 | 0.3 | 0.6 | 0.3 |
| | amount of residual phenol (ppm) | 18 | 25 | 15 | 19 | 12 | 20 |
| | amount of residual diphenyl carbonate (ppm) | 42 | 50 | 36 | 45 | 34 | 40 |

TABLE 1-continued

|  |  | Ex. 12 | Ex. 13 | Ex. 14 | Ex. 15 | Ex. 16 |
|---|---|---|---|---|---|---|
| amount of catalyst (Note 1) | disodium salt of bisphenol A (equivalent) | $5 \times 10^{-7}$ | $5 \times 10^{-7}$ | $5 \times 10^{-7}$ | $5 \times 10^{-7}$ | $5 \times 10^{-7}$ |
|  | tetramethyl ammonium hydroxide (equivalent) | $1 \times 10^{-4}$ | $1 \times 10^{-4}$ | $1 \times 10^{-4}$ | $1 \times 10^{-4}$ | $1 \times 10^{-4}$ |
| amount of catalyst deactivator (Note 2) | tetrabutylphosphonium salt of dodecylbenzenesulfonic acid (equivalent) | 2 | 2 | 2 | 2 | 2 |
| operation conditions of twin screw extruder | kneading pressure (MPa) | 1.5 | 1.5 | 1.5 | 1.5 | 1.5 |
|  | kneading time (seconds) | 20 | 20 | 20 | 20 | 20 |
|  | amount of water (wt %) (Note 3) | 2 | 1 | 1 | 1 | 1 |
|  | resin temperature (° C.) | 290 | 270 | 320 | 290 | 290 |
|  | vent pressure (× 1000 Pa) | 2 | 2 | 2 | 0.667 | 4 |
| experimental results | viscosity average molecular weight | 15200 | 15300 | 15100 | 15300 | 15300 |
|  | color b value | 0.4 | 0.2 | 0.5 | 0.4 | 0.4 |
|  | amount of residual phenol (ppm) | 17 | 23 | 13 | 10 | 25 |
|  | amount of residual diphenyl carbonate (ppm) | 41 | 44 | 34 | 30 | 55 |

Note 1) amount of catalyst based on 1 mol of 2,2-bis(4-hydroxyphenyl)propane
Note 2) amount of catalyst deactivator based on 1 equivalent of disodium salt of bisphenol A
Note 3) amount of water based on throughput of polycarbonate per unit module

Example 17

A polycarbonate was produced in the same manner as in Example 6 except that a tetrabutyl ammonium salt of paratoluenesulfonic acid was used as a catalyst deactivator in an amount shown in Table 2. The measurement results of the amounts of the residual phenol and diphenyl carbonate contained in the obtained polycarbonate and the viscosity average molecular weight and color b value of the polycarbonate are shown in Table 2.

Example 18

A polycarbonate was produced in the same manner as in Example 6 except that butyl paratoluenesulfonate was used as a catalyst deactivator in an amount shown in Table 2. The measurement results of the amounts of the residual phenol and diphenyl carbonate contained in the obtained polycarbonate and the viscosity average molecular weight and color b value of the polycarbonate are shown in Table 2.

Examples 19 and 20

Polycarbonates were produced in the same manner as in Example 6 except that the amount of the catalyst and the amount of the catalyst deactivator were changed as shown in Table 3. The measurement results of the amounts of the residual phenol and diphenyl carbonate contained in each of the obtained polycarbonates and the viscosity average molecular weight and color b value of each of the polycarbonates are shown in Table 3.

Referential Example

A polycarbonate was produced in the same manner as in Example 6 except that the kneading pressure out of the operation conditions of the twin screw extruder was changed as shown in Table 3. The measurement results of the amounts of the residual phenol and diphenyl carbonate contained in the obtained polycarbonate and the viscosity average molecular weight and color b value of the polycarbonate are shown in Table 3.

TABLE 2

|  |  | Ex. 17 | Ex. 18 |
|---|---|---|---|
| amount of catalyst (Note 1) | disodium salt of bisphenol A (equivalent) | $5 \times 10^{-7}$ | $5 \times 10^{-7}$ |
|  | tetramethyl ammonium hydroxide (equivalent) | $1 \times 10^{-4}$ | $1 \times 10^{-4}$ |
| amount of catalyst deactivator (Note 2) | tetrabutyl ammonium salt of paratoluenesulfonic acid (equivalent) | 2 |  |
|  | butyl paratoluenesulfonate (equivalent) |  | 2 |
| operation conditions of twin screw extruder | kneading pressure (MPa) | 1.5 | 1.5 |
|  | kneading time (seconds) | 20 | 20 |
|  | amount of water (wt %) (Note 3) | 1 | 1 |
|  | resin temperature (° C.) | 290 | 290 |
|  | vent pressure (× 1000 Pa) | 2 | 2 |
| experimental results | viscosity average molecular weight | 15300 | 15300 |
|  | color b value | 0.3 | 0.6 |
|  | amount of residual phenol (ppm) | 19 | 23 |
|  | amount of residual diphenyl carbonate (ppm) | 41 | 40 |

Note 1) amount of catalyst based on 1 equivalent of 2,2-bis(4-hydroxyphenyl)propane
Note 2) amount of catalyst deactivator based on 1 equivalent of disodium salt of bisphenol A
Note 3) amount of water based on throughput of polycarbonate per unit module

TABLE 3

|  |  | Ex. 19 | Ex. 20 | R. Ex. |
|---|---|---|---|---|
| amount of catalyst (Note 1) | disodium salt of bisphenol A (equivalent) | $1 \times 10^{-6}$ | $2 \times 10^{-6}$ | $5 \times 10^{-7}$ |
|  | tetramethyl ammonium hydroxide (equivalent) | $1 \times 10^{-4}$ | $1 \times 10^{-4}$ | $1 \times 10^{-4}$ |
| amount of catalyst deactivator (Note 2) | tetrabutylphosphonium salt of dodecylbenzenesulfonic acid (equivalent) | 2 | 2 | 2 |
| operation conditions of twin screw extruder | kneading pressure (MPa) | 1.5 | 1.5 | 0.1 |
|  | kneading time (seconds) | 20 | 20 | 20 |
|  | amount of water (wt %) (Note 3) | 1 | 1 | 1 |
|  | resin temperature (° C.) | 290 | 290 | 290 |
|  | vent pressure (× 1000 Pa) | 2 | 2 | 2 |
| experimental results | viscosity average molecular weight | 15300 | 15300 | 15300 |
|  | color b value | 0.5 | 0.7 | 0.4 |
|  | amount of residual phenol (ppm) | 20 | 19 | 50 |
|  | amount of residual diphenyl carbonate (ppm) | 39 | 40 | 150 |

Note 1) amount of catalyst based on 1 equivalent of 2,2-bis(4-hydroxyphenyl)propane
Note 2) amount of catalyst deactivator based on 1 equivalent of disodium salt of bisphenol A
Note 3) amount of water based on throughput of polycarbonate per unit module
R. Ex.: Referential Example

Example 21

2,2-bis(4-hydroxyphenyl)propane and diphenyl carbonate were charged into a dissolution tank equipped with a stirrer in a molar ratio of 1:1.02 and dissolved after the inside of the tank was substituted by nitrogen.

Thereafter, the mixed solution was supplied continuously to a vertical agitation tank equipped with a fractionating column and maintained at an inner temperature of 220° C. and an inner pressure of $1.333 \times 10^4$ Pa (100 mmHg), a disodium salt of bisphenol A and tetramethyl ammonium hydroxide were added continuously in amounts of $5 \times 10^{-7}$ equivalent and $1 \times 10^{-4}$ equivalent based on 1 mol of 2,2-bis(4-hydroxyphenyl)propane, respectively, and a reaction was carried out by removing the formed phenol from the fractionating column. The obtained reaction product (1) was discharged continuously using a gear pump.

The reaction product (1) was then supplied continuously to a vertical agitation tank equipped with a fractionating column maintained at an inner temperature of 250° C. and an inner pressure of $1.333 \times 10^3$ Pa (10 mmHg). A reaction was carried out by removing the formed phenol from the fractionating column. The obtained reaction (2) product was discharged continuously using a gear pump.

The reaction product (2) was then supplied continuously to a horizontal reactor maintained at an inner temperature of 270° C. and an inner pressure of $1.333 \times 10^2$ Pa (1 mmHg). A polycarbonate having a viscosity average molecular weight of 15,200 was obtained continuously by further carrying out polymerization while the formed phenol was removed from the system. This polycarbonate contained 180 ppm of phenol and 240 ppm of diphenyl carbonate.

This polycarbonate was supplied continuously in a molten state to an intermeshing twin screw extruder comprising 4 modules having a solution adding and kneading area and a vent area. A tetrabutyl phosphonium salt of dodecylbenzenesulfonic acid was added to and kneaded into the polycarbonate continuously as a 0.02 wt % aqueous solution in an amount of 2 equivalents based on 1 equivalent of a disodium salt of bisphenol A used as a polymerization catalyst in the solution adding and kneading area of the first module, then water was removed from the vent of the first module maintained at a pressure of $2.0 \times 10^3$ Pa (15 mmHg) to deactivate the polymerization catalyst, and part of volatile components contained in the polymer was removed. Thereafter, water was added to and kneaded into the polycarbonate continuously in the solution adding and kneading areas of the second to fourth modules in an amount of 1 wt % based on the polycarbonate, volatile components contained in the polycarbonate were removed by reducing the pressure of the vent area right after each of the solution adding and kneading areas to $2.0 \times 10^3$ Pa (15 mmHg), and the polycarbonate was extruded from a dice and then pelletized by a pelletizer to obtain a polycarbonate as a final product.

The measurement results of the amounts of the residual phenol and diphenyl carbonate contained in the obtained polycarbonate and the viscosity average molecular weight and color b value of the polycarbonate are shown in Table 4.

Examples 22 to 32

Polycarbonates were produced in the same manner as in Example 21 except that the amount of the mixed solution and the amount of water were changed in Examples 22 and 23, the kneading time was changed in Examples 24 and 25, the amount of the catalyst deactivator was changed in Examples 26 and 27, the resin temperature was changed in Examples 28, 29 and 30, and the vent pressure was changed in Examples 31 and 32 as shown in Table 4. The measurement results of the amounts of the residual phenol and diphenyl carbonate contained in each of the obtained polycarbonates and the viscosity average molecular weight and color b value of each of the polycarbonates are shown in Table 4.

TABLE 4

|  |  | Ex. 21 | Ex. 22 | Ex. 23 | Ex. 24 | Ex. 25 | Ex. 26 |
|---|---|---|---|---|---|---|---|
| amount of catalyst (Note 1) | disodium salt of bisphenol A (equivalent) | $5 \times 10^{-7}$ | $5 \times 10^{-7}$ | $5 \times 10^{-7}$ | $5 \times 10^{-7}$ | $5 \times 10^{-7}$ | $5 \times 10^{-7}$ |
|  | tetramethyl ammonium hydroxide (equivalent) | $1 \times 10^{-4}$ | $1 \times 10^{-4}$ | $1 \times 10^{-4}$ | $1 \times 10^{-4}$ | $1 \times 10^{-4}$ | $1 \times 10^{-4}$ |
| amount of catalyst deactivator (Note 2) | tetrabutylphosphonium salt of dodecylbenzenesulfonic acid (equivalent) | 2 | 2 | 2 | 2 | 2 | 1 |
| operation conditions of twin screw extruder | amount of mixed solution (wt %) (Note 3) | 1 | 0.3 | 3 | 1 | 1 | 1 |
|  | amount of water (wt %) (Note 4) | 1 | 0.3 | 3 | 1 | 1 | 1 |
|  | kneading time of unit module (seconds) | 4.5 | 4.5 | 4.5 | 1.5 | 18 | 4.5 |
|  | kneading time of total module (seconds) | 18 | 18 | 18 | 6 | 72 | 18 |
|  | resin temperature (° C.) | 290 | 290 | 290 | 290 | 290 | 290 |
|  | vent pressure (× 1000 Pa) | 2 | 2 | 2 | 2 | 2 | 2 |
| experimental results | viscosity average molecular weight | 15200 | 15200 | 15200 | 15200 | 15100 | 15200 |
|  | color b value | 0.3 | 0.5 | 0.5 | 0.4 | 0.5 | 0.3 |
|  | amount of residual phenol (ppm) | 15 | 20 | 18 | 22 | 14 | 15 |
|  | amount of residual diphenyl carbonate (ppm) | 50 | 52 | 51 | 53 | 49 | 50 |
|  |  | Ex. 27 | Ex. 28 | Ex. 29 | Ex. 30 | Ex. 31 | Ex. 32 |
| amount of catalyst (Note 1) | disodium salt of bisphenol A (equivalent) | $5 \times 10^{-7}$ | $5 \times 10^{-7}$ | $5 \times 10^{-7}$ | $5 \times 10^{-7}$ | $5 \times 10^{-7}$ | $5 \times 10^{-7}$ |
|  | tetramethyl ammonium hydroxide (equivalent) | $1 \times 10^{-4}$ | $1 \times 10^{-4}$ | $1 \times 10^{-4}$ | $1 \times 10^{-4}$ | $1 \times 10^{-4}$ | $1 \times 10^{-4}$ |
| amount of catalyst deactivator (Note 2) | tetrabutylphosphonium salt of dodecylbenzenesulfonic acid (equivalent) | 10 | 2 | 2 | 2 | 2 | 2 |
| operation conditions of twin screw extruder | amount of mixed solution (wt %) (Note 3) | 1 | 1 | 1 | 1 | 1 | 1 |
|  | amount of water (wt %) (Note 4) | 1 | 1 | 1 | 1 | 1 | 1 |
|  | kneading time of unit module (seconds) | 4.5 | 4.5 | 4.5 | 4.5 | 4.5 | 4.5 |
|  | kneading time of total module (seconds) | 18 | 18 | 18 | 18 | 18 | 18 |
|  | resin temperature (° C.) | 290 | 220 | 340 | 380 | 290 | 290 |
|  | vent pressure (× 1000 Pa) | 2 | 2 | 2 | 2 | 0.667 | 4 |
| experimental results | viscosity average molecular weight | 15200 | 15300 | 15100 | 14900 | 15200 | 15200 |
|  | color b value | 0.6 | 0.2 | 0.6 | 2.0 | 0.4 | 0.5 |
|  | amount of residual phenol (ppm) | 17 | 20 | 21 | 80 | 10 | 25 |
|  | amount of residual diphenyl carbonate (ppm) | 53 | 55 | 45 | 43 | 25 | 56 |

Note 1) amount of catalyst based on 1 equivalent of 2,2-bis(4-hydroxyphenyl)propane
Note 2) amount of catalyst deactivator based on 1 equivalent of disodium salt of bisphenol A
Note 3) amount of mixed solution based on throughput of polycarbonate in the first module
Note 4) amount of water based on throughput of polycarbonate in the second to fourth modules Example 33

A polycarbonate was produced in the same manner as in Example 21 except that a tetrabutyl ammonium salt of paratoluenesulfonic acid was used as a catalyst deactivator in an amount shown in Table 5. The measurement results of the amounts of the residual phenol and diphenyl carbonate contained in the obtained polycarbonate and the viscosity average molecular weight and color b value of the polycarbonate are shown in Table 5.

Example 33

A polycarbonate was produced in the same manner as in Example 21 except that butyl paratoluenesulfonate was used as a catalyst deactivator in an amount shown in Table 5. The measurement results of the amounts of the residual phenol and diphenyl carbonate contained in the obtained polycarbonate and the viscosity average molecular weight and color b value of the polycarbonate are shown in Table 5.

TABLE 5

|  |  | Ex. 33 | Ex. 34 |
|---|---|---|---|
| amount of catalyst (Note 1) | disodium salt of bisphenol A (equivalent) | $5 \times 10^{-7}$ | $5 \times 10^{-7}$ |
|  | tetramethyl ammonium hydroxide (equivalent) | $1 \times 10^{-4}$ | $1 \times 10^{-4}$ |
| amount of catalyst deactivator (Note 2) | tetrabutyl ammonium salt of paratoluenesulfonic acid (equivalent) | 2 |  |
|  | butyl paratoluenesulfonate (equivalent) |  | 2 |
| operation conditions of twin | amount of mixed solution (wt %) (Note 3) | 1 | 1 |

TABLE 5-continued

|  |  | Ex. 33 | Ex. 34 |
|---|---|---|---|
| screw extruder | amount of water (wt %) (Note 4) | 1 | 1 |
|  | kneading time of unit module (seconds) | 4.5 | 4.5 |
|  | kneading time of total module (seconds) | 18 | 18 |
|  | resin temperature (° C.) | 290 | 290 |
|  | vent pressure (× 1000 Pa) | 2 | 2 |
| experimental results | viscosity average molecular weight | 15200 | 15100 |
|  | color b value | 0.4 | 0.7 |
|  | amount of residual phenol (ppm) | 18 | 25 |
|  | amount of residual diphenyl carbonate (ppm) | 49 | 55 |

Note 1) amount of catalyst based on 1 equivalent of 2,2-bis(4-hydroxyphenyl)propane
Note 2) amount of catalyst deactivator based on 1 equivalent of disodium salt of bisphenol A

Examples 35 and 36

Polycarbonates were produced in the same manner as in Example 21 except that the amount of the catalyst and the amount of the catalyst deactivator were changed as shown in Table 6. The measurement results of the amounts of the residual phenol and diphenyl carbonate contained in each of the obtained polycarbonates and the viscosity average molecular weight and color b value of each of the polycarbonates are shown in Table 6.

Examples 37 to 39

Polycarbonates were produced in the same manner as in Example 21 except that the amount of the mixed solution and the amount of water were changed in Examples 37 and 38 and the kneading time was changed in Example 39 as shown in Table 6. The measurement results of the amounts of the residual phenol and diphenyl carbonate contained in each of the obtained polycarbonates and the viscosity average molecular weight and color b value of each of the polycarbonates are shown in Table 6.

Example 40

A polycarbonate having a viscosity average molecular weight of 15,200 was obtained by adding a disodium salt of bisphenol A and tetramethyl ammonium hydroxide continuously to a mixed solution of 2,2-bis(4-hydroxyphenyl)propane and diphenyl carbonate in a molar ratio of 1:1.02 in amounts of $5 \times 10^{-7}$ equivalent and $1 \times 10^{-4}$ equivalent based on 1 mol of 2,2-bis(4-hydroxyphenyl)propane, respectively, and by carrying out a reaction by removing the formed phenol and subjected to a post-treatment using equipment shown in FIG. 3.

The obtained polycarbonate was supplied continuously to a intermeshing twin screw extruder (reference numeral 21 in FIG. 3) comprising 4 modules, each consisting of a kneading unit, a seal ring unit, a back kneading unit and a full-flight unit.

In the intermeshing twin screw extruder (21 in FIG. 3), a 0.02 wt % aqueous solution of a catalyst deactivator (tetrabutyl phosphonium salt of dodecylbenzenesulfonic acid) was added to and kneaded into the polycarbonate in the adding and kneading area of the first module in an amount of 1 wt % based on the polycarbonate from a liquid injection nozzle (22 in FIG. 3) and the extruder was evacuated at a vent pressure of $2.0 \times 10^3$ Pa in the vent of the first module.

TABLE 6

|  |  | Ex. 35 | Ex. 36 | Ex. 37 | Ex. 38 | Ex. 39 |
|---|---|---|---|---|---|---|
| amount of catalyst (Note 1) | disodium salt of bisphenol A (equivalent) | $1 \times 10^{-6}$ | $2 \times 10^{-6}$ | $5 \times 10^{-7}$ | $5 \times 10^{-7}$ | $5 \times 10^{-7}$ |
|  | tetramethyl ammonium hydroxide (equivalent) | $1 \times 10^{-4}$ | $1 \times 10^{-4}$ | $1 \times 10^{-4}$ | $1 \times 10^{-4}$ | $1 \times 10^{-4}$ |
| amount of catalyst deactivator (Note 2) | tetrabutylphosphonium salt of dodecylbenzenesulfonic acid (equivalent) | 2 | 2 | 2 | 2 | 2 |
| operation conditions of twin screw extruder | amount of mixed solution (wt %) (Note 3) | 1 | 1 | 0.03 | 30 | 1 |
|  | amount of water (wt %) (Note 4) | 1 | 1 | 0.03 | 30 | 1 |
|  | kneading time of unit module (seconds) | 4.5 | 4.5 | 4.5 | 4.5 | 30 |
|  | kneading time of total module (seconds) | 18 | 18 | 18 | 18 | 120 |
|  | resin temperature (° C.) | 290 | 290 | 290 | 290 | 290 |
|  | vent pressure (× 1000 Pa) | 2 | 2 | 2 | 2 | 2 |
| experimental results | viscosity average molecular weight | 15200 | 15200 | 15200 | 15000 | 14900 |
|  | color b value | 0.6 | 0.7 | 0.4 | 0.9 | 1.5 |
|  | amount of residual phenol (ppm) | 20 | 19 | 20 | 20 | 102 |
|  | amount of residual diphenyl carbonate (ppm) | 45 | 40 | 100 | 54 | 52 |

Note 1) amount of catalyst based on 1 equivalent of 2,2-bis(4-hydroxyphenyl)propane
Note 2) amount of catalyst deactivator based on 1 equivalent of disodium salt of bisphenol A
Note 3) amount of mixed solution based on throughput of polycarbonate in the first module
Note 4) amount of water based on throughput of polycarbonate in the second to fourth modules Thereafter, pure water was added to and kneaded into the polycarbonate in an amount of 1 wt % based on the polycarbonate from liquid injection nozzles (23, 24 and 25 in FIG. 3) in each module and the extruder was evacuated at a vent pressure of 2.0×10³ Pa.

A water scrubber condenser was connected to the vent of the twin screw extruder and a vacuum pump (1 in FIG. 3) and pure water having a temperature of 10° C. was supplied from two sprays at a flow rate 200 times the total amount of water used as a devolatilizing agent per a spray. A solid cone spray nozzle shown in FIG. 5 was used in the scrubber.

The scrubbing solution discharged from the scrubber was supplied to a scrubbing solution storage tank (7 in FIG. 3) connected by a scrubbing solution line (11 in FIG. 3), mixed thoroughly by a stirrer and discharged continuously from a scrubbing solution line (12 in FIG. 3) provided at the bottom of the scrubbing solution storage tank by a scrubbing solution pump (13 in FIG. 3).

The scrubbing solution discharged by the pump was further supplied and filtered by a 1 μm-mesh cartridge filter (14 in FIG. 3) connected by a scrubbing solution line (15 in FIG. 3), supplied to a plate heat exchanger (18 in FIG. 3) to be re-cooled at 10° C. and recycled to the scrubber condenser.

A vapor line (9 in FIG. 3) for connecting the intermeshing twin screw extruder (21 in FIG. 3) and the scrubber and a vacuum line for connecting the scrubber and the vacuum pump (1 in FIG. 3) were kept warm with steam. The vapor inlet portion of the scrubber (5 in FIG. 3) was covered with a steam jacket to prevent the deposition of a low-boiling product by local cooling.

In this example, 30 days of continuous operation is possible without a problem and volatile components removed during this were collected by the cartridge filter.

When the vacuum collection system was disassembled and inspected after 30 days of continuous operation, the adhesion of foreign substances to the inside of the equipment was not seen and it was confirmed that smooth continuous operation was possible.

What is claimed is:

1. An aromatic polycarbonate extruder which is a twin screw extruder for kneading components into a molten aromatic polycarbonate, wherein the component is at least one component selected from the group consisting of a catalyst deactivator, devolatilizing agent and resin additives, characterized in that the extruder comprises at least one module (A) consisting of a kneading unit, a material seal unit which is a seal ring unit or a back flight unit, a back kneading unit and a full-flight unit which are arranged in order from an upstream side to a downstream side.

2. The extruder of claim 1, wherein a component supply port is formed in the area of the kneading unit in module (A).

3. The extruder of claim 1, wherein a vent port is formed in the area of the full-flight unit in module (A).

4. The extruder of claim 1, comprising 2 to 8 of module (A).

5. The extruder of claim 1, wherein the aromatic polycarbonate is a polycarbonate produced by melt polymerizing an aromatic dihydroxy compound and a carbonic acid diester compound in the presence of an ester exchange catalyst.

6. A method of kneading components into an aromatic polycarbonate using a twin screw extruder, wherein the component is at least one component selected from the group consisting of a catalyst deactivator, devolatilizing agent and resin additives, characterized in that the extruder comprises at least one module (A) consisting of a kneading unit, a material seal unit which is a seal ring unit or a back flight unit, a back kneading unit and a full-flight unit which are arranged in order from an upstream side to a downstream side, and in that the method comprises the steps of:

(1) supplying the components to the area of the kneading unit of the module (A) of the twin screw extruder; and (2) discharging volatile components from the area of the full-flight unit of the module (A) of the twin screw extruder.

7. The method of claim 6, wherein the component is at least one component selected from the group consisting of a catalyst deactivator, devolatilizing agent and resin additives.

8. The method of claim 6, wherein the component is water as a devolatilizing component or water containing a catalyst deactivator.

9. The method of claim 8, wherein water as a devolatilizing component or water containing a catalyst deactivator is supplied to the area of the kneading unit of module (A) at an absolute pressure of 0.3 to 10 MPa.

10. The method of claim 6, wherein the component is a resin additive.

11. The kneading method of claim 6, wherein the aromatic polycarbonate is a polycarbonate produced by melt polymerizing an aromatic dihydroxy compound and a carbonic acid diester compound in the presence of an ester exchange catalyst.

12. A method of removing volatile components from a twin screw extruder comprising at least one module (A) consisting of a kneading unit, a material seal unit which is a seal ring unit or a back flight unit, a back kneading unit and a full-flight unit which are arranged in order from an upstream side to a downstream side, together with water vapor by supplying water to the twin screw extruder and kneading it into a molten aromatic polycarbonate, the method comprising the steps of:

supplying water to the twin screw extruder at an absolute pressure of 0.3 to 10 MPa; and discharging water vapor and volatile components from the extruder at an absolute pressure of $1.333 \times 10$ Pa to $1.013 \times 10^5$ Pa.

13. The removing method of claim 12, wherein water contains a catalyst deactivator.

14. The removing method of claim 12, wherein the amount of water is 0.1 to 20 parts by weight based on 100 parts by weight of the aromatic polycarbonate.

15. The removing method of claim 12, wherein water contains a catalyst deactivator in an amount of 0.5 to 50 equivalent based on 1 equivalent of a polymerization catalyst contained in the aromatic polycarbonate.

16. The removing method of claim 12, wherein the time required to knead water in the twin screw extruder is 0.05 to 100 seconds.

17. The removing method of claim 12, wherein the twin screw extruder comprises at least one module (A) consisting of a kneading unit, a material seal unit which is a seal ring unit or a back flight unit, a back kneading unit and a full-flight unit which are arranged in order from an upstream side to a downstream side, water is supplied to the area of the kneading unit of the module (A), and water vapor is discharged from the area of the full-flight unit to the outside of the module (A) together with volatile components.

18. The method of claim 12, wherein the aromatic polycarbonate is a polycarbonate produced by melt polymerizing an aromatic dihydroxy compound and a carbonic acid diester compound in the presence of an ester exchange catalyst.

19. The aromatic polycarbonate extruder according to claim 1, further comprising at least one module (B) consisting of a neutral kneading unit or forward kneading unit, a back kneading unit and a full-flight unit which are arranged in order from an upstream side to a downstream side.

* * * * *